US010976278B2

(12) United States Patent
Chowdhury et al.

(10) Patent No.: US 10,976,278 B2
(45) Date of Patent: Apr. 13, 2021

(54) MODIFYING FUNCTIONALITY OF AN ELECTRONIC DEVICE DURING A MOISTURE EXPOSURE EVENT

(71) Applicant: Apple Inc., Cupertino, CA (US)

(72) Inventors: Ihtesham H. Chowdhury, Los Altos, CA (US); Eric N. Nyland, Santa Clara, CA (US); Scott A. Myers, Saratoga, CA (US); Christopher T. Mullens, San Francisco, CA (US); Bingrui Yang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/054,811

(22) Filed: Aug. 3, 2018

(65) Prior Publication Data

US 2019/0064998 A1    Feb. 28, 2019

Related U.S. Application Data

(60) Provisional application No. 62/552,779, filed on Aug. 31, 2017.

(51) Int. Cl.
*G01N 27/22*   (2006.01)
*G06F 3/041*   (2006.01)
(Continued)

(52) U.S. Cl.
CPC .......... *G01N 27/223* (2013.01); *G03B 17/08* (2013.01); *G06F 1/1626* (2013.01);
(Continued)

(58) Field of Classification Search
CPC ...... G06F 3/0418; G06F 3/0414; G06F 3/044; G06F 3/0412; G06F 1/1656;
(Continued)

(56) References Cited

U.S. PATENT DOCUMENTS 6,730,863 B1 *  5/2004  Gerpheide .............. G06F 3/044
178/18.02
8,717,331 B2 *  5/2014  Kremin ................. G06F 3/0418
345/174
(Continued)

FOREIGN PATENT DOCUMENTS

CN    106357935 A    1/2017
CN    105339877 B    9/2018
WO    2015088453 A1  6/2015

*Primary Examiner* — Grant Sitta
(74) *Attorney, Agent, or Firm* — Dorsey & Whitney LLP

(57) ABSTRACT

This application relates to an electronic device that includes a processor and a display assembly overlaid by a protective cover. The display assembly can include a touch detection system capable of detecting a touch event at the protective cover. The touch detection system can include a capacitance detector capable of detecting a change in capacitance and a location corresponding to the change in capacitance, and an applied force detector capable of detecting an amount and a location of a force applied to the protective cover that is associated with the touch event. The electronic device can include a moisture detector capable of detecting an amount of moisture present at the protective cover, where when the amount of moisture is greater than a threshold amount, the processor determines a position of the touch event based on detection signals provided by the capacitance detector and the applied force detector.

17 Claims, 18 Drawing Sheets

(51) Int. Cl.
*G06F 3/044* (2006.01)
*G06F 1/16* (2006.01)
*H04N 5/232* (2006.01)
*G03B 17/08* (2021.01)
*G06F 1/3206* (2019.01)
*H04N 5/225* (2006.01)
*G01N 27/04* (2006.01)

(52) U.S. Cl.
CPC .......... *G06F 1/1643* (2013.01); *G06F 1/1656* (2013.01); *G06F 1/1694* (2013.01); *G06F 1/3206* (2013.01); *G06F 3/044* (2013.01); *G06F 3/0412* (2013.01); *G06F 3/04144* (2019.05); *G06F 3/04186* (2019.05); *H04N 5/23245* (2013.01); *H04N 5/232933* (2018.08); *G01N 27/048* (2013.01); *G06F 2203/04104* (2013.01); *G06F 2203/04106* (2013.01); *H04N 5/2252* (2013.01); *H04N 5/22521* (2018.08); *H04N 5/23216* (2013.01)

(58) Field of Classification Search
CPC . G06F 2203/04106; G06F 2203/04104; G06F 1/1626; G06F 3/04186; G06F 3/04144; G06F 1/1643; G06F 1/1694; G06F 1/3206; H04N 5/23245; H04N 5/22521; H04N 5/2252; H04N 5/23216; H04N 5/232933; G03B 17/08; G01N 27/048; G01N 27/223
See application file for complete search history.

(56) References Cited

U.S. PATENT DOCUMENTS

| | | | | |
|---|---|---|---|---|
| 8,773,146 | B1* | 7/2014 | Hills | G01N 27/22 324/658 |
| 9,310,934 | B2* | 4/2016 | Ng | G06F 3/0418 |
| 9,606,681 | B2 | 3/2017 | Rodzevski et al. | |
| 9,705,309 | B2* | 7/2017 | Peng | G06F 21/81 |
| 9,733,144 | B2* | 8/2017 | Miura | G01L 19/0092 |
| 9,880,655 | B2* | 1/2018 | O'Connor | G06F 3/0416 |
| 9,904,411 | B2* | 2/2018 | Wu | G06F 3/04186 |
| 9,904,427 | B1* | 2/2018 | Co | G06F 3/041661 |
| 10,126,892 | B2* | 11/2018 | Chintalapoodi | G01N 27/223 |
| 10,606,396 | B1* | 3/2020 | Smith | G06F 3/04815 |
| 10,642,408 | B2* | 5/2020 | Mun | G06F 3/0418 |
| 2007/0254697 | A1* | 11/2007 | Sugio | H04M 1/72538 455/556.2 |
| 2008/0136792 | A1* | 6/2008 | Peng | G06F 3/0416 345/174 |
| 2011/0228074 | A1 | 9/2011 | Parulski et al. | |
| 2011/0228075 | A1* | 9/2011 | Madden | G03B 15/05 348/81 |
| 2012/0023450 | A1* | 1/2012 | Noto | G06F 3/04886 715/825 |
| 2012/0236173 | A1* | 9/2012 | Telek | G03B 17/08 348/223.1 |
| 2012/0256867 | A1 | 10/2012 | Annacone | |
| 2012/0293447 | A1* | 11/2012 | Heng | G06F 3/044 345/174 |
| 2013/0257797 | A1* | 10/2013 | Wu | G06F 3/044 345/174 |
| 2014/0104207 | A1* | 4/2014 | Park | G06F 3/041 345/173 |
| 2014/0106503 | A1* | 4/2014 | Hirakata | H01L 29/7869 438/104 |
| 2014/0377877 | A1* | 12/2014 | Burgi | G01N 33/4972 436/120 |
| 2015/0022481 | A1* | 1/2015 | Andersson | G06F 3/044 345/174 |
| 2015/0062069 | A1* | 3/2015 | Shin | G06F 3/044 345/174 |
| 2015/0070180 | A1* | 3/2015 | Aotake | H04M 1/18 340/626 |
| 2015/0077394 | A1* | 3/2015 | Dai | G06F 3/0416 345/174 |
| 2015/0254962 | A1* | 9/2015 | Lee | G08B 21/24 340/539.32 |
| 2015/0268782 | A1 | 9/2015 | Kim et al. | |
| 2015/0277720 | A1* | 10/2015 | Thorson | G06F 3/0412 345/174 |
| 2015/0279009 | A1* | 10/2015 | Enoki | H04N 9/646 382/254 |
| 2015/0355716 | A1* | 12/2015 | Balasubramanian | G06F 3/017 345/173 |
| 2015/0378496 | A1* | 12/2015 | Vandermeijden | G06F 3/0416 345/174 |
| 2016/0146935 | A1* | 5/2016 | Lee | H04M 1/18 367/87 |
| 2016/0266717 | A1* | 9/2016 | Oral | G06F 3/04186 |
| 2016/0306491 | A1* | 10/2016 | Lee | G06F 3/02 |
| 2016/0334294 | A1* | 11/2016 | Ueno | G06F 1/1633 |
| 2016/0334935 | A1* | 11/2016 | Jeon | G06F 3/04886 |
| 2016/0337596 | A1* | 11/2016 | Miura | H04N 5/23245 |
| 2016/0337597 | A1* | 11/2016 | Miura | H04N 5/2252 |
| 2016/0379605 | A1* | 12/2016 | Morobishi | G01F 23/263 345/174 |
| 2017/0010691 | A1* | 1/2017 | Morobishi | G06F 3/044 |
| 2017/0059503 | A1* | 3/2017 | Tanabe | H04M 1/72577 |
| 2017/0213525 | A1* | 7/2017 | Tamegai | G09G 5/006 |
| 2017/0285866 | A1* | 10/2017 | Heim | G06F 3/0418 |
| 2017/0336891 | A1* | 11/2017 | Rosenberg | G06F 3/0421 |
| 2017/0336899 | A1* | 11/2017 | Szeto | G06F 3/04142 |
| 2018/0088024 | A1* | 3/2018 | Alessi | G01N 19/10 |
| 2018/0103206 | A1* | 4/2018 | Olson | H04N 5/2252 |

\* cited by examiner

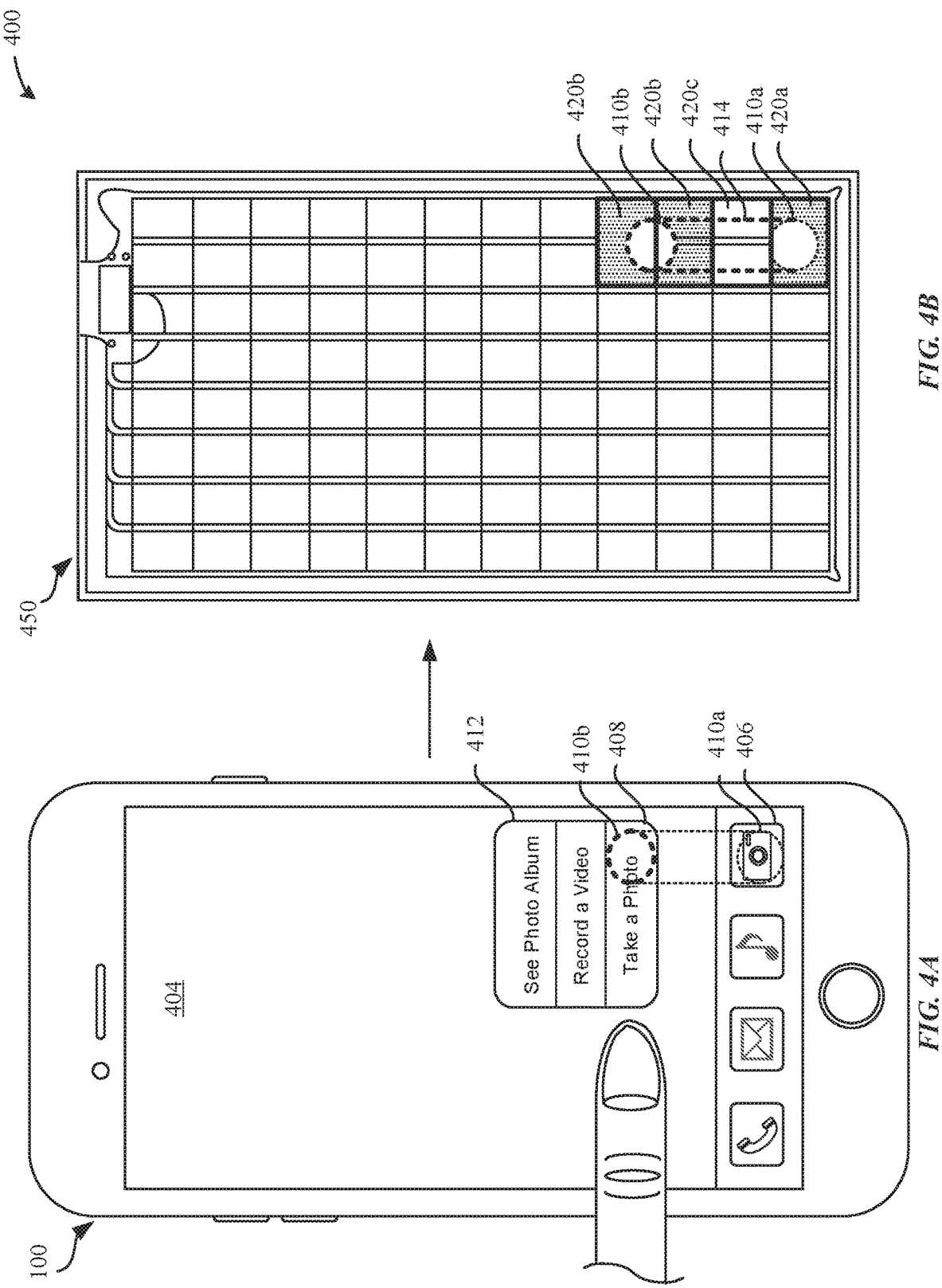

MODIFYING FUNCTIONALITY OF AN ELECTRONIC DEVICE DURING A MOISTURE EXPOSURE EVENT

CROSS-REFERENCE TO RELATED APPLICATIONS

The present application claims the benefit of U.S. Provisional Application No. 62/552,779, entitled "MODIFYING FUNCTIONALITY OF AN ELECTRONIC DEVICE DURING A MOISTURE EXPOSURE EVENT," filed Aug. 31, 2017, the content of which is incorporated herein by reference in its entirety for all purposes.

FIELD

The described embodiments relate generally to detecting when an electronic device is exposed to a moisture event. More particularly, the described embodiments involve the electronic device executing specialized functions in conjunction with detecting the moisture event.

BACKGROUND

In recent years, there has been a proliferation in the number of different user functions that are capable of being executed by electronic devices. In particular, due to recent technological advances, many user functions which were previously only capable of being executed by dedicated electronic devices (e.g., cameras, video cameras, telephones, etc.) can be presently executed by a single electronic device. For example, a single portable electronic device (e.g., smartwatches, smartphones, computer tablets, etc.) is presently capable of executing multiple user functions (e.g., taking photographs, capturing video, etc.) in different user environments. Accordingly, there is a need for the portable electronic device to effectively execute these multiple user functions in different environmental conditions.

SUMMARY

To cure the foregoing deficiencies, the representative embodiments set forth herein disclose various techniques for detecting when an electronic device is exposed to a moisture event. More particularly, the described embodiments involve the electronic device executing specialized functions in conjunction with detecting the moisture event.

According to some embodiments, a portable electronic device is described. The portable electronic device can include a housing that carries components that include a processor capable of receiving an input signal and providing a corresponding instruction, and a display assembly in communication with the processor and overlaid by a protective cover. The display assembly can include a touch detection system capable of detecting a touch event at the protective cover. According to some embodiments, the touch detection system can include a capacitance detector capable of (i) detecting a change in capacitance and a location corresponding to the change in capacitance in accordance with the touch event, and (ii) providing a first detection signal to the processor. Furthermore, the touch detection system can include an applied force detector capable of (i) detecting an amount and a location of a force applied to the protective cover that is associated with the touch event, and (ii) providing a second detection signal to the processor. Moreover, the portable electronic device can include a moisture detector in communication with the processor and capable of detecting an amount of moisture present at the protective cover, where when the amount of moisture is determined by the processor to be greater than a threshold amount, the processor determines a position of the touch event with respect to the protective cover using both the first and second detection signals.

According to some embodiments, an electronic device for modifying a user interface when a moisture event occurs, is described. The electronic device can include a housing that defines a cavity, where the housing carries components within the cavity that includes a processor capable of providing instructions and a touch display unit in communication with the processor. The touch display unit can include a cover layer capable of receiving an applied force associated with a touch input. The touch display unit can further include a force detection component capable of determining a position of the touch input based on a location of the applied force. The touch display unit can further include a display layer capable of presenting the user interface that includes at least a first icon and a second icon, where the first and second icons are defined by a first arrangement. The electronic device can further include a sensor in communication with the processor, where the sensor is capable of detecting the moisture event and provides a feedback signal to the processor when the sensor detects an occurrence of the moisture event, and the processor responds by (i) modifying the user interface such that the first and second icons are defined by a second arrangement that is different from the first arrangement, and (ii) activating the force detection component such that the processor is capable of determining based on the location of the applied force whether the first icon or the second icon is selected by the touch input.

According to some embodiments, an electronic device for executing a function is described. The electronic device can include an enclosure that carries operational components that can include a processor capable of providing instructions and a touchscreen unit in communication with the processor. The touchscreen unit can include a display for presenting a user interface and a cover layer capable of receiving a touch input. The touchscreen unit can further include a force input detection component capable of determining an amount of force associated with the touch input. The touchscreen unit can further include a touch input detection component capable of determining a position of the touch input based on an electrical capacitance value in accordance with the touch input, where when the processor determines that the electrical capacitance value does not satisfy an electrical capacitance threshold value, the processor responds by activating the force input detection component to determine the position of the touch input based on the amount of the force associated with the touch input.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 4A-4B illustrate example conceptual diagrams of detecting input at an electronic device, according to some embodiments.

Figure 1:
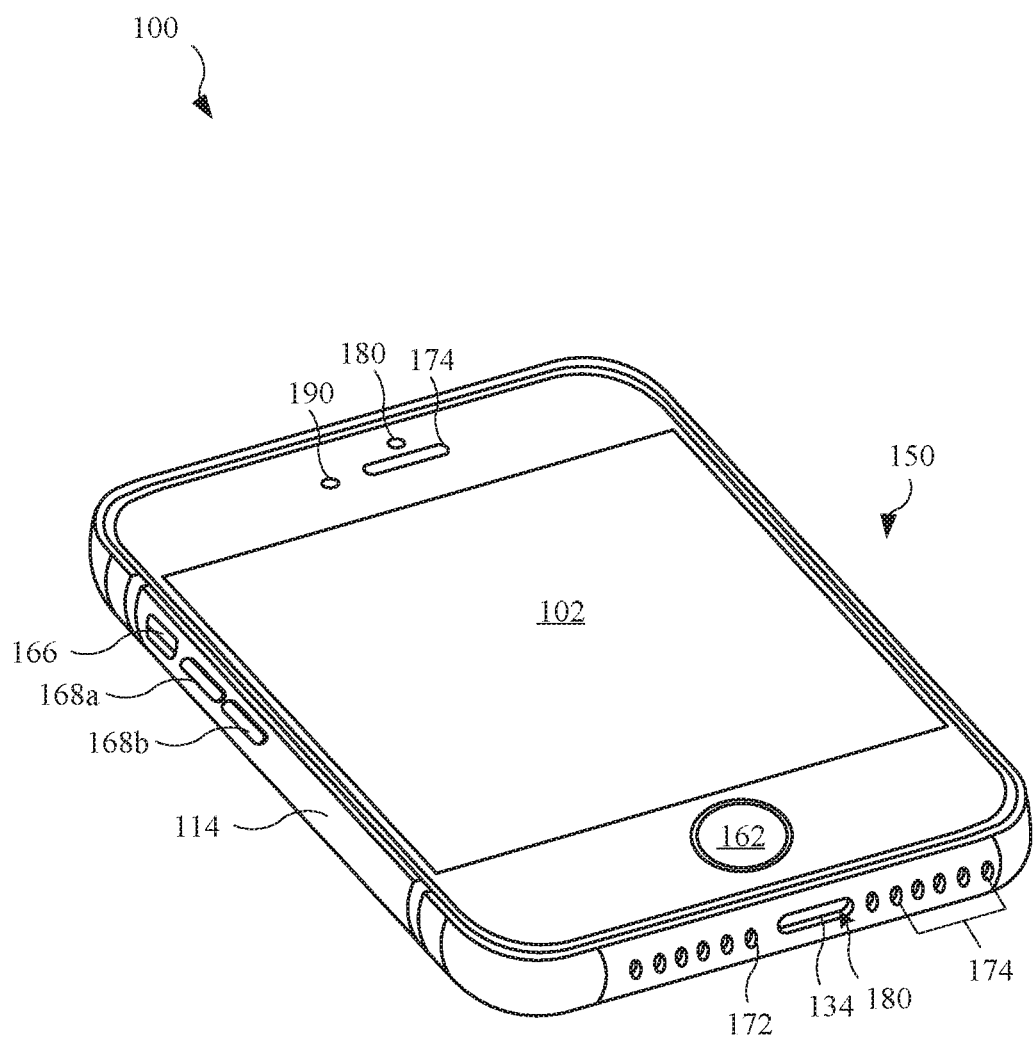
FIG. 1 illustrates an isometric view of an electronic device that is capable of implementing the various techniques described herein, according to some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein set forth techniques for enabling an electronic device to modify its functionality in response to determining that the electronic device is exposed to a moisture event. In some examples, the electronic device can refer to a media player, a camera, a smartphone, a smartwatch, a computer tablet, a portable computer, a fitness tracker, a touchscreen electronic device, and the like. Although recent technological advances have enabled electronic devices to execute a number of different user functions (e.g., take photographs, capture video, place phone calls, browse the internet, etc.), these electronic devices are unable to optimally execute these different user functions when the electronic device is exposed to an inhospitable environment (e.g., a wet environment) or a challenging event (e.g., the user is wearing non-capacitive gloves to operate a touchscreen display of the electronic device). In particular, although electronic devices can utilize touchscreen displays to determine when a selection of a user function is executed, the hardware components/software components associated with these touchscreen displays are unable to optimally execute these user functions (e.g., accurately determine a position of the touch input) on a consistent basis when exposed to such inhospitable environments or challenging events. Consequently, the user experience suffers.

According to some embodiments, the electronic device can be configured to determine when it is currently exposed to the moisture event. In some examples, the moisture event can range between a small amount of liquid that is present on a cover layer of the electronic device to the electronic device being completely submerged within a liquid. When the electronic device is exposed to the moisture event, a touch input detection component of the electronic device may be unable to accurately determine a position of a touch input event at the cover layer. For instance, the presence of the liquid can cause the touch input detection component to indicate "false touches." Additionally, the electronic device can be configured to implement different functionalities based on the type of moisture event that is detected, as described in greater detail herein.

According to some embodiments, the electronic device can be configured to determine when it is exposed to a wet moisture event, such as when droplets of liquid are present on the cover layer of the electronic device or present in a data-entry port of the electronic device. Consequently, the presence of the droplets of liquid on the cover layer can cause inaccurate detection of a position of a touch input event. In one example, the electronic device can utilize a touch input detection component to measure an electrical capacitance value of a touch input event that is present at the cover layer. As described in conjunction with FIG. 8, the electronic device can be configured to compare the measured electrical capacitance value to an electrical capacitance threshold value to determine whether the electronic device is exposed to the wet moisture event. In response to determining that the measured electrical capacitance value does not satisfy the electrical capacitance threshold value, then the electronic device can determine that it is currently exposed to the wet moisture event. As described in conjunction with FIG. 9, the electronic device can be configured to establish a confidence score for a position of the touch input event that is based on the measured electrical capacitance value. If the confidence score does not satisfy a confidence threshold value, then the electronic device can determine that it is exposed to the wet moisture event. In another example, the electronic device can utilize an ambient light sensor or an infrared light sensor to determine whether it is exposed to the moisture event, as described in conjunction with FIG. 1. In yet another example, the electronic device can detect for changes in impedance at the data-entry port of the electronic device to determine if it is exposed to the wet moisture event, as described in conjunction with FIG. 1.

In any event, when the electronic device determines that is exposed to the wet moisture event, the electronic device can activate a force touch input detection component that can be configured to provide a detection signal that corresponds to a centroid of force associated with the touch input event. In this manner, the electronic device can utilize a combination of respective detection signals provided by the touch input detection component and the force input detection component to determine the position of the touch input event at the cover layer, as described in conjunction with FIGS. 2, 3, 4A-4B, and 5A-5B. Furthermore, while the electronic device is exposed to the wet mode, the electronic device can be configured to optimize camera/video settings for water photography, such as by modifying a user interface and its icons, as described in conjunction with FIGS. 11A-11B, 12, and 15.

According to some embodiments, the electronic device can be configured to determine when it is exposed to a submerged moisture event, such as when the electronic device is partially/entirely submerged in a liquid. During the submerged moisture event, the electronic device can determine that the touch input detection component is unable to determine the position of the touch input event at the cover layer, and can rely upon a combination of the force input detection component, a modified user interface, or programmable soft keys to execute specific functionalities. In one example, the electronic device can utilize an environmental pressure sensor to determine an amount of pressure that is exerted against a housing of the electronic device, as described in conjunction with FIG. 6. In response to determining that the amount of pressure satisfies a pressure threshold value, then the electronic device can determine that it is submerged in a liquid. In another example, the electronic device can utilize a combination of an acoustic feedback unit (e.g., speaker) and acoustic detection unit (e.g., microphone) to generate an acoustic sound effect, as described in conjunction with FIG. 7. In response to determining that a sound parameter value associated with acoustic sound effect satisfies a sound parameter threshold value, then the electronic device can determine that it is submerged in a liquid. In another example, the electronic device can utilize a touch input detection component to measure an electrical capacitance value of a touch input event that is present at a cover layer of the electronic device. As described in conjunction with FIG. 8, the electronic device can be configured to compare the measured electrical capacitance value to an electrical capacitance threshold value to determine that the electronic device is submerged in a liquid when the measured electrical capacitance value does not satisfy the electrical capacitance threshold value. In yet another example, the electronic device can utilize an ambient light sensor or an infrared light sensor to determine whether the electronic device is exposed to the submerged moisture event, as described in conjunction with FIG. 1.

In any event, when the electronic device determines that is exposed to the submerged moisture event, the electronic device can rely upon the force touch input detection component to determine a position of the touch input event, as described in conjunction with FIGS. 3, 4A-4B, and 5A-5B. In some examples, the electronic device can prevent the touch input detection component from providing a detection signal that corresponds to its detected position of the touch input event. Furthermore, while the electronic device is exposed to the submerged moisture event, the electronic device can be configured to optimize camera/video settings for underwater photography, such as by modifying a user interface of the electronic device, as described in conjunction with FIGS. 11C and 15. For example, the electronic device can simplify the user interface and enlarge commonly-used icons of the user interface to enable the user to easily select these icons. Additionally, when the electronic device is exposed to the submerged moisture event, the electronic device can assign specific functions to programmable soft keys that when depressed cause the electronic device to execute underwater camera/video functions, as described in conjunction with FIGS. 10, 13A-13B, and 14. In this manner, the electronic device can utilize alternative techniques to execute user functions that compensate for the absence of utilizing the touch input detection component.

These and other embodiments are discussed below with reference to FIGS. 1-3, 4A-4B, 5A-5B, 6-10, 11A-11C, 12, 13A-13B, and 14-16; however, those skilled in the art will readily appreciate that the detailed description given herein with respect to these figures is for explanatory purposes only and should not be construed as limiting.

FIG. 1 illustrates an isometric view of an electronic device that is capable of implementing the various techniques described herein, according to some embodiments. As illustrated in FIG. 1, an electronic device 100 can include a housing 114 that can be configured to secure components, including a cover layer 102, a data-entry port 134, a touch display unit 150, I/O components 162, 166, 168a-b, an acoustic detection unit 172, an acoustic feedback unit 174, an environmental sensor 180, and a camera unit 190. According to some examples, the housing 114 can include a combination of seals and/or gaskets to prevent water intrusion or minimize water intrusion into any one of the components as described herein.

According to some embodiments, the cover layer 102 can overlay a touch display unit 150. In some examples, the cover layer 102 can protect the touch display unit 150. In particular, the touch display unit 150 can include a display layer (not illustrated) that is capable of presenting a user interface that includes at least one icon for executing a function at the electronic device 100. Additionally, the touch display unit 150 can include a touch input detection component that can be configured to detect a touch input event (e.g., a user's finger contacts the cover layer 102). In particular, the touch input detection component can include an array of sensing electrodes that can be configured to determine a position of the touch input event at the cover layer 102 based on the specific sensing electrodes that are activated (e.g., undergo a change in capacitance), as described in greater detail in conjunction with FIG. 2.

According to some embodiments, the touch display unit 150 can include a force input detection component/load detector that can be configured to determine an amount of force/load that is exerted against the cover layer 102 by the user's appendage. The force input detection component can be configured to determine a centroid of force associated with the touch input event at the cover layer 102. For example, the force input detection component can include multiple parallel electrical capacitance plates that are activated (e.g., undergo a change in capacitance). In another example, the force input detection component can include a strain gage or a strain-based force sensor which undergo a change in resistance.

According to some embodiments, the electronic device 100 can activate the force input detection component to determine the position of the touch input event at the cover layer 102 in response to detecting that the electronic device 100 is exposed to a moisture event. In some cases, the touch display unit 150 can compare a measured capacitance value that is detected by the touch input detection component to a threshold capacitance value. For example, the presence of a liquid on the cover layer 102 can increase the electrical capacitance value that is detected by the array of sensing electrodes. If the electronic device 100 detects that the measured capacitance value satisfies a capacitance threshold value, then the electronic device 100 can determine that the electronic device 100 is exposed to the moisture event. In another case, the electronic device 100 can utilize the environmental sensor 180 to detect whether a measured environmental parameter value measured by the environmental sensor 180 satisfies an environmental parameter threshold value. If the electronic device 100 detects that the measured environmental parameter value satisfies the environmental parameter threshold value, then the electronic device 100 can determine that the electronic device 100 is exposed to the moisture event. In any case, the electronic device 100 can activate the force input detection component to determine the position of the touch input event at the cover layer 102. In some cases, the force input detection component can supplement or augment the position of the touch input event as determined by the touch input detection component.

According to some embodiments, the housing 114 can carry a number of different I/O components 162, 166, and 168a-b. In some examples, at least one of the I/O components 162, 166, 168a-b can be capable of being actuated by the user between a first position and a second position. In one example, the I/O component 162 can refer to a home button that is configured to be actuated between an elevated position and a depressed position. When the I/O component 162 is actuated to the depressed position, the I/O component 162 can execute an intelligent personal assistant and knowledge navigator, such as Siri®. In another example, the I/O component 166 can refer to a slide-switch that is capable of being actuated from a first position that is associated with executing a "Do-Not-Disturb" mode, and actuation of the slide-switch to the second position that is associated with executing a "Audible Notification" mode. In another example, the I/O component 168a-b can refer to a rocker switch, where first and second ends of the I/O component 168a-b can be configured to adjust a volume setting/ringer loudness setting of the electronic device 100.

According to some embodiments, the electronic device 100 can include an acoustic detection unit 172 (e.g., a microphone, etc.) and an acoustic feedback unit 174 (e.g., speakers). As described in greater detail with reference to FIG. 7, the electronic device 100 can utilize the acoustic detection unit 172 and the acoustic feedback unit 174 to determine that the electronic device 100 is exposed to the moisture event. In some examples, the acoustic detection unit 172 and the acoustic feedback unit 174 can be waterproofed by using a seal to prevent liquids or contaminants from entering therein. According to some embodiments, the electronic device 100 can include a camera unit 190 that can be configured to take photographs/video, as described in greater detail herein. In some cases, the camera unit 190 can include a lighting unit (e.g., a flash module).

According to some embodiments, the electronic device 100 can include at least one environmental sensor 180 that is capable of detecting environmental conditions that are in proximity to the electronic device 100. In some examples, the environmental sensor 180 can include at least one of a light sensor, a proximity sensor, an accelerometer, a liquid sensor, a pressure sensor, a magnetic field sensor, a strain gage, a capacitive sensor, a force sensor, a gyroscope, a compass, a barometer, ambient light sensor, an IR light emitter/detector, a load cell, thermometer, linear acceleration, fingerprint sensor, and the like. In some embodiments, the environmental sensor 180 can determine whether the electronic device 100 is exposed to the moisture event. For example, the environmental sensor 180 can refer to a pressure sensor that can be configured to determine that the electronic device 100 is submerged in water. According to some embodiments, the environmental sensor 180 and the touch display unit 150 can establish a feedback loop for modifying the one or more functionalities associated with the touch display unit 150, as described in greater detail herein.

According to some embodiments, the environmental sensor 180 can refer to an ambient light sensor that is capable of determining an amount of ambient light present in the nearby surroundings of the electronic device 100. In some examples, the ambient light sensor can refer to a photodiode or a phototransistor that is capable of converting light photons into an electrical current or voltage. In some examples, the ambient light sensor can detect a decrease in ambient light when the electronic device 100 is submerged underwater. In response to determining that there is less than a desired amount of ambient light detected, the electronic device 100 can be configured to enhance the brightness or contrast of the touch display unit 150 in order to enable the user to clearly view a display.

According to some embodiments, the environmental sensor 180 can refer to an electromagnetic radiation emitter/sensor, such as a proximity sensor, which can be capable of emitting and detecting an amount of electromagnetic radiation (e.g., infrared light) to detect the presence of liquid on the cover layer 102. In particular, the infrared light sensor can be capable detecting an amount of infrared light that reflects off liquid that is present on the cover layer 102. In some examples, the infrared light sensor can include an IR filter that blocks non-infrared light. Based on the amount of infrared light that is detected by the environmental sensor 180, the electronic device 100 can determine if there is liquid present. In some examples, the environmental sensor 180 can modify its algorithm for determining whether the electronic device 100 is exposed to the moisture event. For example, the algorithm can include optical characteristics such as refractive index, movement of the liquid, infrared light absorption, and so forth. For example, liquid (e.g., water) has a higher index of refraction (~1.3) than the index of refraction of air (~1.0). Accordingly, when the infrared light travels through the liquid, less of the infrared light can be reflected back to the infrared light sensor due to the increase in infrared light that is scattered. Accordingly, if the amount of infrared light that is detected is less than an infrared light threshold value, the electronic device 100 can determine that it is currently exposed to the moisture event. In some cases, the electronic device 100 can establish different infrared light threshold values that correspond to: (1) the presence of liquid on the cover layer 102 (e.g., water droplets), and (2) the electronic device 100 is submerged within a liquid. By comparing the amount of infrared light to these infrared light threshold values, the electronic device 100 can determine if it is to engage in a dry mode, in a wet mode, or in a submerged mode.

According to some embodiments, the environmental sensor 180 can cooperate in conjunction with the camera unit 190 to determine whether the electronic device 100 is currently exposed to the moisture event. In particular, the environmental sensor 180 can include a combination of an infrared light projector and an infrared light camera that can be configured to provide a depth measurement. In some cases, the infrared light projector can emit a pattern of infrared light dots. In turn, this emitted pattern of infrared light can be reflected off an object (e.g., droplets of liquid present on the cover layer 102). Subsequently, the infrared light camera can detect the reflected pattern of infrared light dots. By comparing the reflected pattern of infrared light dots to a baseline pattern of infrared light dots, the environmental sensor 180 can determine a distance parameter (e.g., distance) between the electronic device 100 and the object (e.g., droplets of liquid). For example, the environmental sensor 180 can determine a change in coordinates (e.g., X-axis, Y-axis, etc.) of an infrared light dot associated with the emitted pattern and a corresponding infrared light dot associated with the reflected pattern. Accordingly, this change in coordinates can provide an indication of a distance between the object and the electronic device 100. In some cases, the distance parameter generated by the environmental sensor 180 can be combined with an image of the object taken by the camera unit 190 in order to form a depth measurement of the object from the electronic device 100. Moreover, an algorithm for forming the depth measurement can take into account optical characteristics such as refractive index, movement of the liquid, infrared light absorption, and so forth. When the electronic device 100 is in the submerged mode or the wet mode, these optical characteristics can be adjusted to enable the electronic device 100 to form a more accurate depth measurement of the object.

As illustrated in FIG. 1, the environmental sensor 180 can also be carried proximate to a data-entry port 134 that enables the electronic device 100 to receive data/power. For example, the environmental sensor 180 can be configured to alert the user as to the presence of moisture within the data-entry port 134 in order to prevent corrosion of metal contacts included within the data-entry port 134. In particular, the data-entry port 134 can undergo a change in impedance when moisture is present. The environmental sensor 180 can compare the change in impedance to a impedance threshold value to determine if moisture is present at the data-entry port 134.

Figure 2:
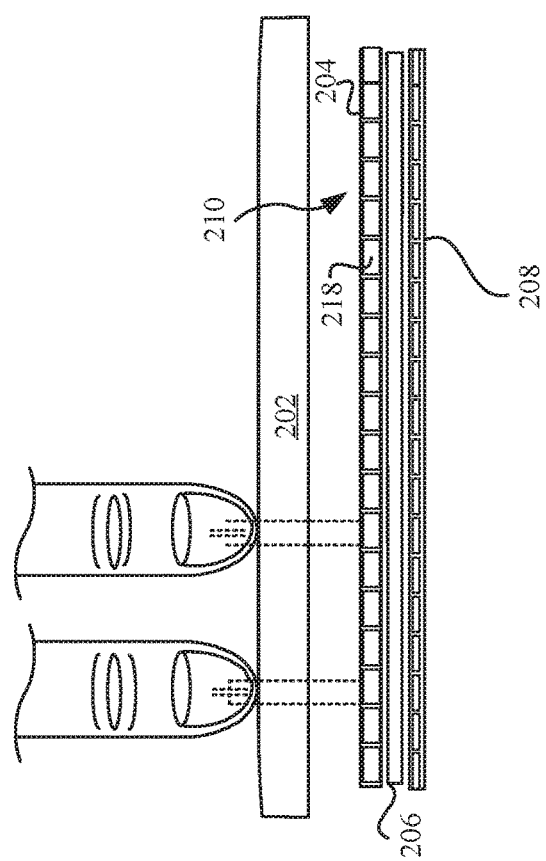
FIG. 2 illustrates a partial exploded view of an electronic device, according to some embodiments.

FIG. 2 illustrates a partial exploded view of the electronic device 100 as illustrated in FIG. 1, in accordance with some embodiments. As illustrated in FIG. 2, the electronic device 200 can include a cover layer 202 that overlays a display module 210, such as to protect an underlying display module 210. According to some embodiments, the display module 210 can include a touch input detection component 204, a display layer 206, and a force input detection component 208. Although FIG. 2 illustrates that the touch input detection component 204, the display layer 206, and the force input detection component 208 are separated from each other, it should be noted that FIG. 2 also encapsulates those embodiments where two or more of these components can be integrated into a single component. In one example, the touch input detection component 204 can be integrated with the display layer 206. In another example, the force input detection component 208 can be integrated with the display layer 206. In yet another example, the touch input and force input detection components 204, 208 can be integrated with the display layer 206.

In some examples, the cover layer 202 can be secured to the display module 210 via an adhesive layer (not illustrated). In other examples, the touch input detection component 204 can be adhesively secured to the display layer 206, which is adhesively secured to the force input detection component 208. In some examples, the touch input detection component 204 and the force input detection component 208 are separate layers secured to the display layer 206.

According to some embodiments, the touch input detection component 204 can be configured to detect a touch input event when, for example, a user's appendage is in proximity to the cover layer 202 (or touches the cover layer 202). In particular, the touch input detection component 204 can include an array of sensing electrodes 218 (e.g., electrical capacitive sensors) that can be configured to measure an electrical capacitance value. In some examples, each of the sensing electrodes 218 can be configured to hold an electrical charge. Accordingly, when the user's appendage is comes into proximity with the cover layer 202, the user's appendage can function as a capacitive element that forms a capacitive circuit with the sensing electrode 218. As a result, the specific sensing electrodes 218 that are in proximity to the user's appendage can undergo a change in capacitance (e.g., a voltage change). Subsequently, the specific sensing electrodes 218 can provide a processor (not illustrated) of the electronic device 200 with a measured capacitance value. In turn, the electronic device 200 can determine a position of the touch input event based on coordinates of the specific sensing electrodes 218 that were activated (e.g., undergo a change in capacitance). In some cases, multiple sensing electrodes 218 can be simultaneously activated in order to provide positional information for multiple touch input events ("multi-touch"), such as when the user performs a "pinch" gesture to zoom in on live view image that is presented by the user interface.

In some examples, the electronic device 200 can differentiate between a "false touch" and "true touch" based on the measured capacitance value. For example, a "false touch" can refer to a change in electrical capacitance value of one or more sensing electrodes 218 based upon an environmental event (e.g., droplets of water), while a "true touch" can refer to a change in electrical capacitance value of one or more sensing electrodes 218 based on contact with the user's appendage. As previously stated, the presence of liquid on the cover layer 202 can increase the measured capacitance value of those specific sensing electrodes 218 that are in proximity to the liquid. Thus, without a means to differentiate liquid and the user's appendage, the electronic device 200 may not be able to accurately determine the position of the touch input event. According to some embodiments, the electronic device 200 can be configured to utilize the force input detection component 208 to differentiate between "false touches" and "true touches," as described in greater detail herein.

According to some embodiments, the display layer 206 can be configured to present a user interface (not illustrated), where the user interface includes at least one icon. The at least one icon can execute a function when selected by the touch input event. In some examples, the display layer 206 can refer to a liquid crystal display ("LCD") that relies upon backlighting to present the visual information. In other examples, the display layer 206 can refer to an organic light emitted diode ("OLED") display designed to illuminate individual pixels.

According to some embodiments, the force input detection component 208 can be configured to determine an amount of force/load that is exerted against at least one of the cover layer 202, the touch input detection component 204, the display layer 206, or the force input detection component 208. In some cases, the force input detection component 208 can be configured to differentiate between the amount of force/load that is applied to each of these separate components. In some examples, the force input detection component 208 can include one or more strain gages or strain-based force sensors which utilizes a resistive component. The user's appendage being exerted against the cover layer 202 can cause a change in a measured value at specific force sensors (not illustrated) of the force input detection component 208. In some examples, the specific force sensors are capable of providing a detection signal to the processor (not illustrated) when the measured electrical value satisfies a force threshold value (e.g., capacitance, resistance, etc.). Alternatively, when the measured electrical value does not satisfy the force threshold value, then the specific force sensors do not provide the detection signal to the processor. Thus, an increase in the measured electrical value of the specific force sensors can be directly caused by an increase in force/load exerted against the cover layer 202. In turn, the electronic device 200 can determine a position of the user's appendage at the cover layer 202 by determining coordinates of the specific force sensors that are activated. In some examples, the touch input detection component 204 can be integrated into the force input detection component 208.

Figure 3:
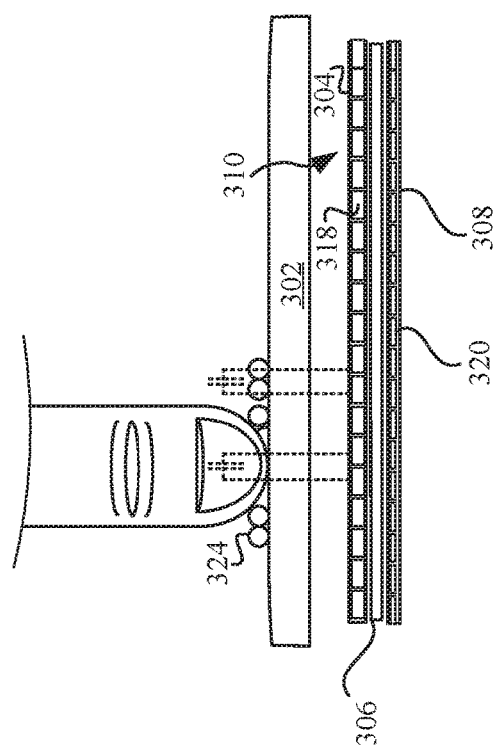
FIG. 3 illustrates a partial exploded view of an electronic device, according to some embodiments.

FIG. 3 illustrates a partial exploded view of the electronic device 100 illustrated in FIG. 1, in accordance with some embodiments. As illustrated in FIG. 3, the electronic device 300 can include a display module 310. As illustrated in FIG. 3, the display module 310 can include a touch input detection component 304 that is capable of receiving a touch input event, a display layer 306 capable of presenting a user interface that includes at least one icon, and a force input detection component 308 capable of detecting an amount of force that is associated with the touch input event that is applied against the cover layer 302. Although FIG. 3 illustrates that the touch input detection component 304, the display layer 306, and the force input detection component 308 are separated from each other, it should be noted that FIG. 3 also encapsulates those embodiments where two or more of these components can be integrated into a single component. In one example, the touch input detection component 304 can be integrated with the display layer 306. In another example, the force input detection component 308 can be integrated with the display layer 306. In yet another example, the touch input and force input detection components 304, 308 can be integrated with the display layer 306, such as an in-cell display.

As illustrated in FIG. 3, a portion of the cover layer 302 is covered by a film of liquid 324. The film of liquid 324 can act as a capacitive element that forms multiple capacitive circuits with the touch input detection component 304. Thus, even when the user's appendage comes into contact with the cover layer 302, the touch input detection component 304 may be unable to differentiate the user's appendage ("true touch") from the film of liquid 324 ("false touch"). As previously described herein, in some examples, the electronic device 300 can utilize the force input detection component 308 to confirm or augment a position of the touch input event, when the electronic device 300 is unable to differentiate between a "false touch" and a "true touch." For example, when both a liquid and the user's appendage come into contact with the cover layer 302, both can cause an increase in the measured capacitance value of those specific sensing electrodes 318 that are in proximity to the liquid/user's appendage. Consequently, the specific sensing electrodes 318 that are activated can provide a signal to the processor (not illustrated) that the position of the touch input event corresponds to the respective coordinates of the specific sensing electrodes 318. In turn, the display layer 306 can present an inaccurate indication at the user interface of the user's intent.

According to some embodiments, the electronic device 300 can be configured to utilize the force input detection component 308 to differentiate between the "false touch" and the "true touch" by confirming a centroid of an amount of force associated with the touch input event at the cover layer 302. The force input detection component 308 can include force sensors 320 that are generally distributed throughout the force input detection component 308. When the user's appendage presses against a portion of the cover layer 302, the force/load associated with the depressing of the cover layer 302 can be distributed throughout a localized region of the cover layer 302. In turn, the distribution of the force at the localized region can cause an individual force sensor 320 in proximity to the localized region of the cover layer 302 to undergo a change in an electrical parameter (e.g., resistance, etc.). In turn, these specific force sensors 320 are activated and can provide a detection signal to a processor (not illustrated) of the electronic device 300. Subsequently, the electronic device 300 can determine the centroid of the amount of force associated with the touch input event at the cover layer 302 by correlating to the coordinates of the specific force sensors 320 that were activated. Thereafter, the centroid of force can be correlated to the touch input event by determining coordinates of specific force sensors 320 that were activated. Beneficially, in this manner, the force input detection component 308 is able to confirm the position of the touch input event when the touch input detection component 304 is unable to. In some cases, the processor (not illustrated) can supplement any detection signal associated with the position of the touch input event that is provided by the touch input detection component 304 with a respective detection signal provided by the force input detection component 308. Furthermore, utilizing the force input detection component 308 can provide X-axis, Y-axis, and Z-axis coordinates of the centroid of the touch input event.

According to some embodiments, the electronic device can utilize a sealing element to provide a seal, in a manner similar to a gasket, against ingress of liquids that may pass through openings between the cover layer and a housing of the electronic device. In some examples, the cover layer can overlay a display assembly. In some cases, the sealing element can serve as a force input detection component that is capable of detecting an amount of force that is applied to a cover layer. In particular, the sealing element can include first and second flexible circuits that that combine to form a parallel plate capacitor separated by an electrically nonconductive dielectric material, such as silicon. In this regard, the first and second flexible circuits may be electrically coupled with an integrated circuit (disposed on a circuit board) such that one of the flexible circuits stores electrical charge. When the central layer is pressed by the user's appendage in accordance with a touch input event, a force associated with the touch input event can be detected, which can be utilized by the electronic device to determine a centroid of the touch input event at the cover layer.

FIGS. 4A-4B illustrate a conceptual diagram 400 of an example user interface that can be implemented at an electronic device—e.g., the electronic device 100—and a corresponding force input detection component—e.g., the force input detection component 308—of the electronic device 100 that can be configured to determine a position of the touch input event at the user interface. This can occur, for example, subsequent to the electronic device 100 activating the force input detection component 308 in response to determining that the electronic device 100 is exposed to a moisture event.

As illustrated in FIG. 4A, the electronic device 100 can present a user interface 404 that corresponds to a home screen of the electronic device 100. In this example, the home screen includes the user interface 404 that includes several icons (e.g., e-mail, music, telephone, etc.), where each of the icons is associated with a respective specific function as indicated by an image of the icon. Furthermore, in this example, an icon 406 that is associated with a camera application is illustrated in FIG. 4A. The camera application can be configured to execute a camera function when the icon 406 is selected by the user's touch input. As illustrated in FIG. 4A, a first position 410a of the touch input event can correspond to the user selecting the icon 406. In response to selecting the icon 406, the user interface 404 can present a sub-menu 412 associated with the camera application. Subsequently, the user can select a specific function ("Take a Photo") 408 that is presented within the sub-menu 412 by moving the touch input to a second position 410b. In response to selecting the specific function ("Take a Photo") 408, the electronic device 100 can present a camera interface, as described in greater detail in conjunction with FIGS. 5A-5B.

FIG. 4B illustrates a conceptual diagram of a force input detection component 450 that corresponds to the user interface 404 of the electronic device 100, as illustrated in FIG. 4A. The force input detection component 450 can include an array of force sensors 420. As previously described herein, specific force sensors 420 of the force input detection component 450 are activated by the force associated with the user's touch input event. The specific force sensors 420 that are proximate to the touch input event are activated, and subsequently can provide a measured change in a parameter (e.g., undergo a change in resistance that exceeds a resistance threshold, etc.). For example, the first position 410a of the touch input event can correspond to the activation of the force sensor 420a, while the second position 410b of the touch input event can correspond to the activation of the set of force sensors 420b. By identifying which of the force sensors 420 are activated, the electronic device 100 can determine a position of the touch input event at the user interface 404. Notably, FIG. 4B illustrates that two force sensors 420b are activated. This can occur, for example, when the touch input falls in-between two or more force sensors 420b. It should be noted that the distribution of the force sensors 420 throughout the force input detection component 450 can vary according to the desired sensitivity of detecting the touch input event.

Additionally, the force input detection component 450 indicates a gap 414 is present between the force sensor 420a and the set of force sensors 420b. The gap 414 can correspond to a force sensor 420c that was not activated as the user's appendage did not exert sufficient force against this portion of the cover layer 302.

Figure 5A:
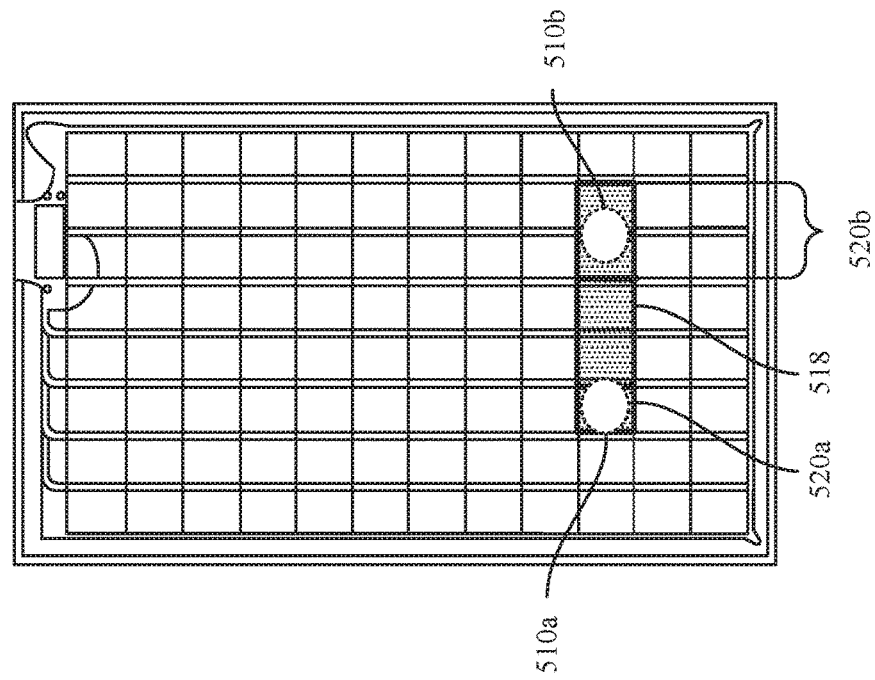
FIGS. 5A-5B illustrate example conceptual diagrams of detecting input at an electronic device, according to some embodiments.
Figure 5B:
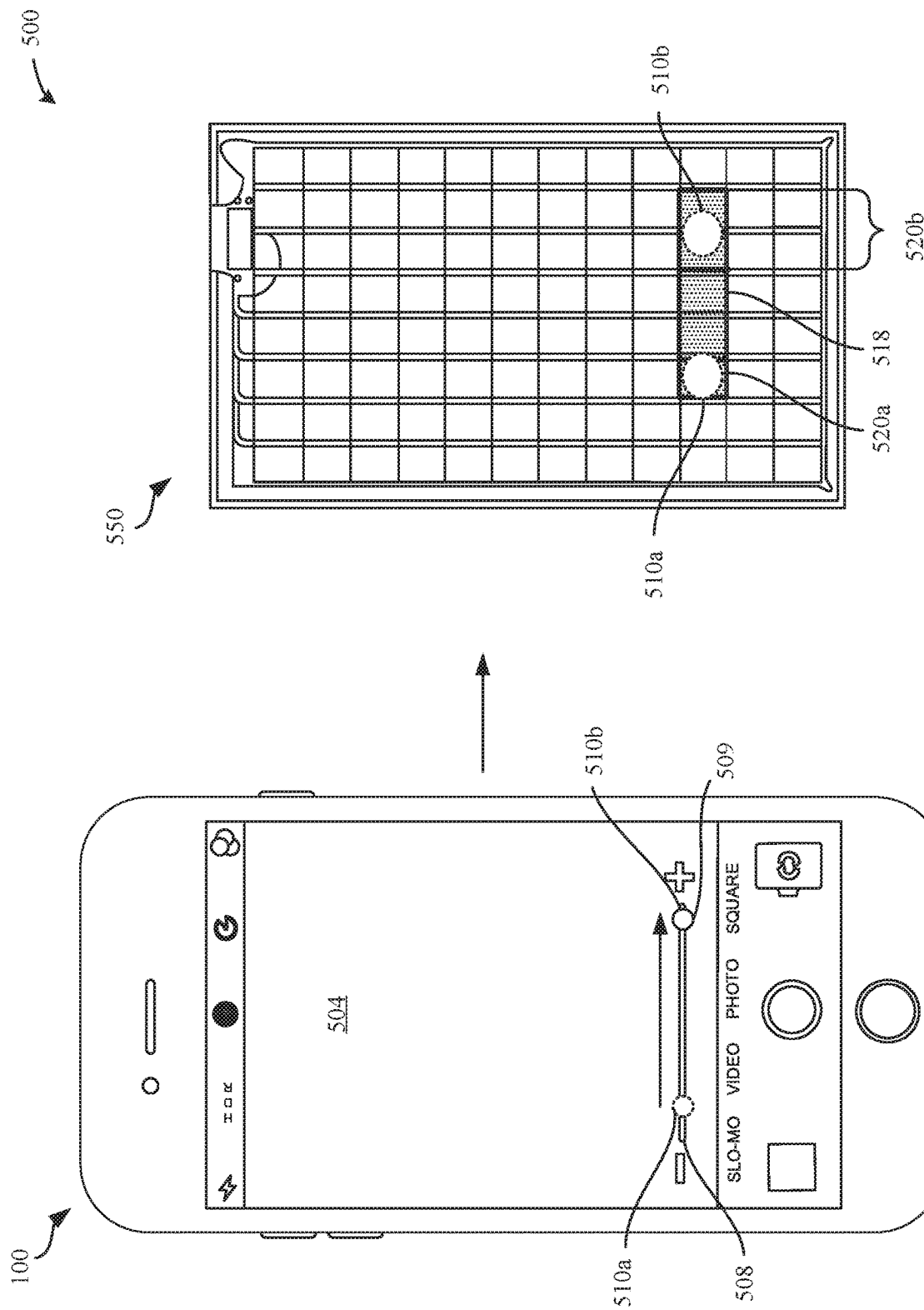

FIGS. 5A-5B illustrate a conceptual diagram 500 of an example user interface that can be implemented at an electronic device—e.g., the electronic device 100—and a corresponding force input detection component—e.g., the force input detection component 308—of the electronic device 100 that can be configured to determine a position of the touch input event at a user interface 504. This can occur, for example, subsequent to the electronic device 100 determining that the user has selected the icon 406 that is associated with the camera application, as described in conjunction with FIGS. 4A-4B.

As illustrated in FIG. 5A, the electronic device 100 can present a user interface 504 that is associated with the camera application. In this example, the user interface 504 can include a scroll bar 508 having a first end and a second end, where the user can toggle a cursor 509 between the first and second ends in order to zoom-out/zoom-in on a live image view that is presented at the user interface 504. As illustrated, a first position 510a of the cursor 509 can correspond to zooming-out of the live view image, while a second position 510b of the cursor 509 can correspond to zooming-in on the live view image.

FIG. 5B illustrates a conceptual diagram of a force input detection component 550 that corresponds to the user interface 504 of the electronic device 100, as illustrated in FIG. 5A. The force input detection component 550 can include an array of force sensors 520. As illustrated in FIG. 5B, the first position 510a of the cursor 509 can correspond to the activation of the force sensor 520a, while the second position 510b of the cursor 509 can correspond to the activation of the set of force sensors 520b. By identifying which of the force sensors 520 are activated, the electronic device 100 can determine the position of the touch input event at the user interface 504. Notably, FIG. 5B illustrates a row 518 of consecutively adjacent force sensors 520 that are activated by the touch input event. In particular, the activation of the row of consecutively adjacent force sensors 520 can imply that the user's appendage exerted a sufficient amount of force against the cover layer 302 such as to activate all of the force sensors 520 that are included between the force sensor 520a and the position corresponding to the force sensor 520b.

Figure 6:
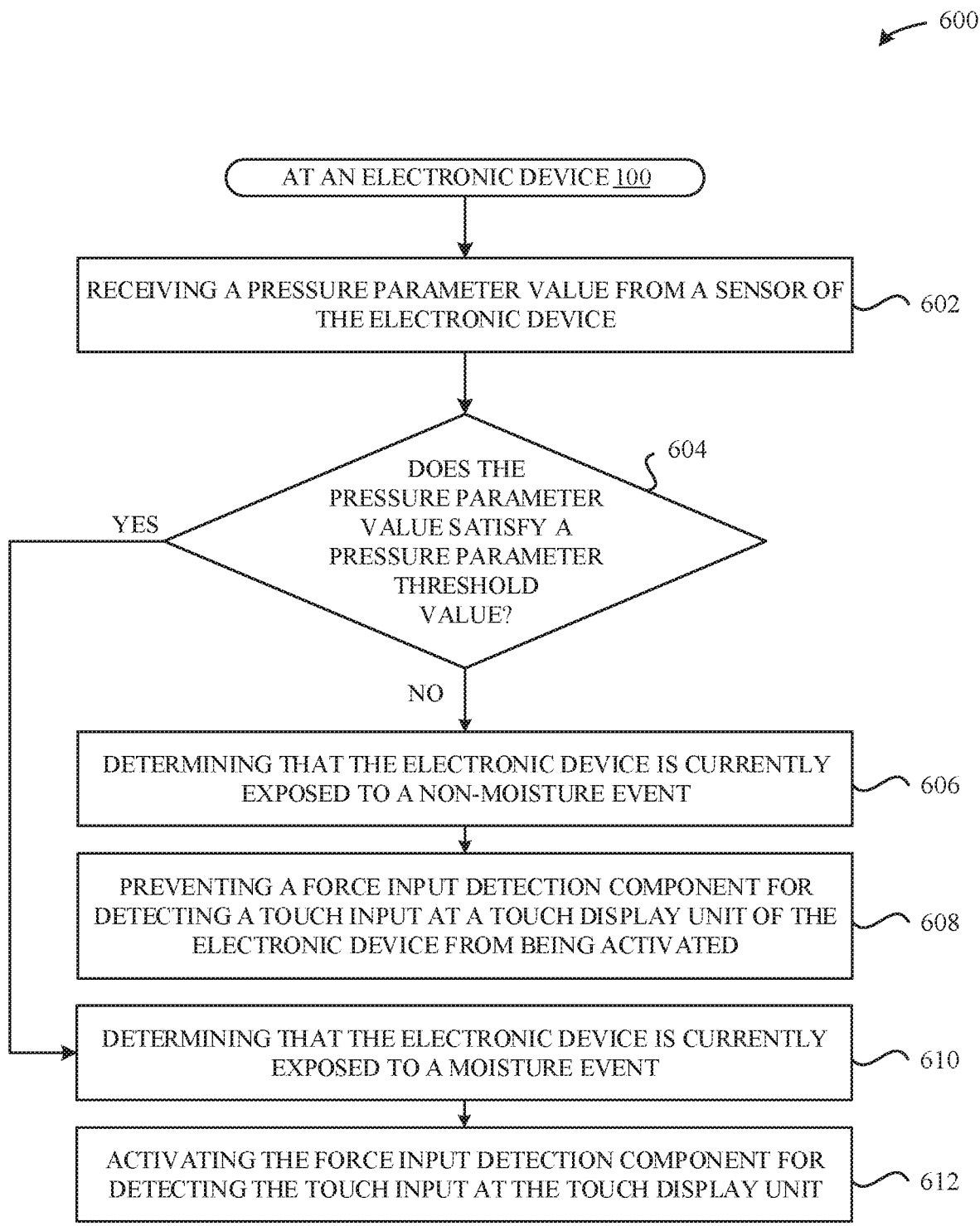
FIG. 6 illustrates a method for enabling an electronic device to execute specialized functionality in response to detecting a moisture event, according to some embodiments.

FIG. 6 illustrates a method 600 for enabling an electronic device to activate a force input detection component in response to determining that the electronic device is exposed to a moisture event, according to some embodiments. As illustrated in FIG. 6, the method 600 begins at step 602, where an electronic device—e.g., the electronic device 100—receives a pressure parameter value from an environmental sensor 180 of the electronic device 100. In some examples, the pressure parameter value can be beneficial in enabling the electronic device 100 to determine that it is submerged underwater.

In some cases, the environmental sensor 180 can periodically monitor for changes in the pressure parameter value, and subsequently provide a detection signal when the pressure parameter value satisfies a pressure parameter value threshold. For example, the environmental sensor 180 can measure an amount of atmospheric pressure that is exerted against the housing 114 of the electronic device 100. In other cases, the electronic device 100 can utilize the environmental sensor 180 to provide a pressure parameter value when the electronic device 100 determines that a position of a touch input event at the cover layer 302 cannot be determined with sufficient confidence or that the measured electrical capacitance value of the sensing electrodes 218 of the touch input detection component 204 do not satisfy an electrical capacitance value threshold. For example, the electronic device 100 can establish different thresholds for different events: (1) a baseline threshold when neither liquid nor the user's appendage are in contact with the cover layer 302, (2) a water detection threshold that is greater than the baseline threshold when liquid is present on the cover layer 302, and (3) a touch input event detection threshold that is greater than the water detection threshold when the user's appendage is in contact with the cover layer 302. In other cases, the environmental sensor 180 can monitor for the pressure parameter value when the touch input detection component 204 receives erratic and random touch input events. In any event, the electronic device 100 can utilize the environmental sensor 180 to determine that the electronic device 100 is exposed to the moisture event.

At step 604, the electronic device 100 can determine whether the pressure parameter value satisfies a pressure parameter threshold value. In some cases, the electronic device 100 can establish a table of different pressure parameter values and the environmental conditions that they each correspond to. For example, the electronic device 100 can establish that an atmospheric pressure at sea level is about 14.7 pounds per square inch (or about 100 kPa). If the electronic device 100 determines that the pressure parameter value is greater than 14.7 pounds per square inch, then the electronic device 100 can determine that it is exposed to the moisture event (e.g., submerged underwater).

At step 606, in response to determining that the pressure parameter value does not satisfy the pressure parameter threshold value, then the electronic device 100 can determine that the electronic device 100 is not currently exposed to the moisture event. In turn, at step 608, the electronic device 100 can prevent the force input detection component 308 from being activated. In other words, the electronic device 100 can determine that it is not necessary to activate the force input detection component 308 to augment the touch input detection component 304 to accurately determine the position of the touch input event at the cover layer 202. Although it is noted that in some examples, the electronic device 100 can utilize other types of environmental sensor(s) 180 to monitor for other environmental parameter values that may indicate that the electronic device 100 is exposed to the moisture event. For example, the electronic device 100 can determine that an increase in resistance of a moisture interface element of the data-entry port 134 has deteriorated a bridge material and is indicative of moisture intrusion.

Returning back to step 604, if the electronic device 100 determines that the pressure parameter value satisfies the pressure parameter threshold value, then the electronic device 100 can determine that it is currently exposed to the moisture event (e.g., submerged underwater) as indicated by step 610. For example, if the atmospheric pressure parameter value is 15.2 pounds per square inch, then the electronic device 100 can determine that it is submerged underwater.

At step 612, the electronic device 100 can activate the force input detection component 308 to augment the touch input detection component 304 in order to accurately determine a centroid of force associated with the touch input at the cover layer 302—within a required confidence level. In other cases, the force input detection component 308 can be utilized by the electronic device 100 to entirely replace the touch input detection component 304 to determine the position of the touch input event at the cover layer 302.

Figure 7:
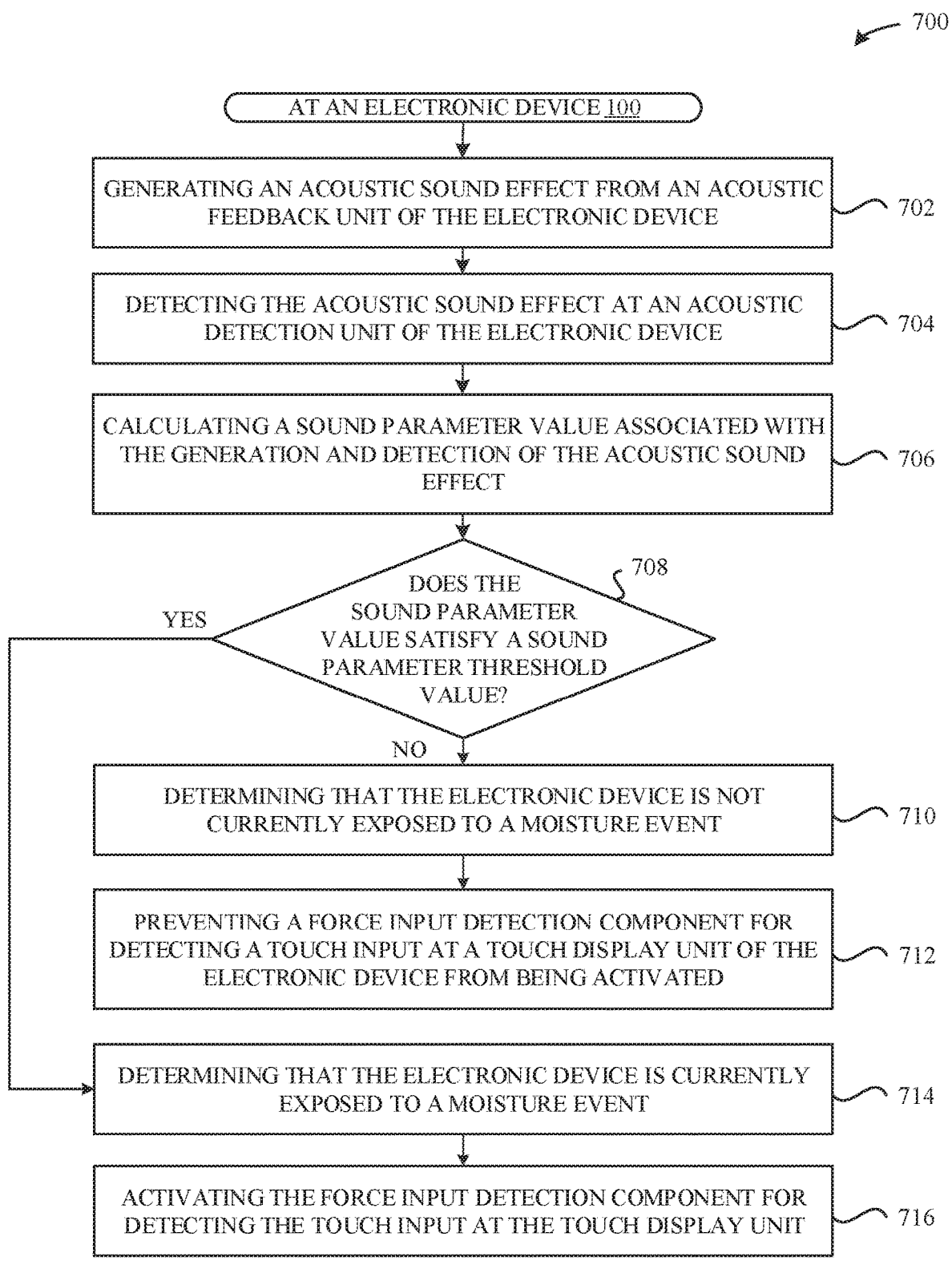
FIG. 7 illustrates a method for enabling an electronic device to execute specialized functionality in response to detecting a moisture event, according to some embodiments.

FIG. 7 illustrates a method 700 for enabling an electronic device to activate a force input detection component in response to determining that the electronic device is exposed to a moisture event, according to some embodiments. As illustrated in FIG. 7, the method 700 begins at step 702, where an electronic device—e.g., the electronic device 100—generates an acoustic sound effect by an acoustic feedback unit—e.g., the acoustic feedback unit 174—in order to determine whether the electronic device 100 is presently exposed to the moisture event. In some examples, the acoustic sound effect can be beneficial in enabling the electronic device 100 to determine that it is submerged underwater. In particular, sound travels faster through a liquid (e.g., water) than in a gas (e.g., air). In another example, the acoustic sound effect as detected can have a measured sound dB level that is different from the acoustic sound effect as emitted. As previously described herein, the acoustic sound effect can be generated when the electronic device 100 is unable to satisfactorily determine a position of the touch input event at the cover layer 102. In another example, the acoustic sound effect can be generated when the electronic device 100 determines that does not satisfy an electrical capacitance value threshold.

At step 704, the electronic device 100 can utilize an acoustic detection unit 172 to detect the acoustic sound effect. In some examples, the acoustic sound effect that is generated is characterized as having a sound frequency that is not perceivable by human hearing (i.e., greater than 20,000 Hz or less than 20 Hz).

Subsequently, at step 706, the electronic device 100 can calculate a sound parameter value that is associated with the generating and detection of the acoustic sound effect. In some cases, the sound parameter value can refer to an amount of time for the acoustic sound effect to reach the acoustic detection unit 172 from the acoustic feedback unit 174. In some cases, the electronic device 100 can compare the sound parameter value to a sound parameter threshold value, and determine whether the sound parameter value is outside of an acceptance range of the sound parameter threshold value. In any case, the electronic device 100 can determine whether the sound parameter value satisfies the sound parameter threshold value, as indicated by step 708.

At step 710, if the electronic device 100 determines that the sound parameter value does not satisfy the sound parameter threshold value, then the electronic device 100 can determine that the electronic device is not currently exposed to the moisture event (e.g., submerged underwater). In turn, the electronic device 100 can prevent the force input detection component 308 from being activated, such as to preserve energy in the electronic device 100, as indicated by step 712. Thus, the electronic device 100 can continue to solely rely upon the touch input detection component 304 to determine the position of the touch input event at the cover layer 302.

Returning back to step 708, if the electronic device 100 determines that the sound parameter value satisfies the sound parameter threshold value, then the electronic device 100 can determine that the electronic device 100 is currently exposed to the moisture event (e.g., submerged underwater), as indicated by step 714. Subsequently, the electronic device 100 can activate the force input detection component 308 to augment the touch input detection component 304 in order to accurately determine the position of the touch input at the cover layer 302—within a required confidence level, as indicated by step 716. In other cases, the force input detection component 308 can be utilized by the electronic device 100 to entirely replace the touch input detection component 304 to determine the position of the touch input event at the cover layer 302.

Figure 8:
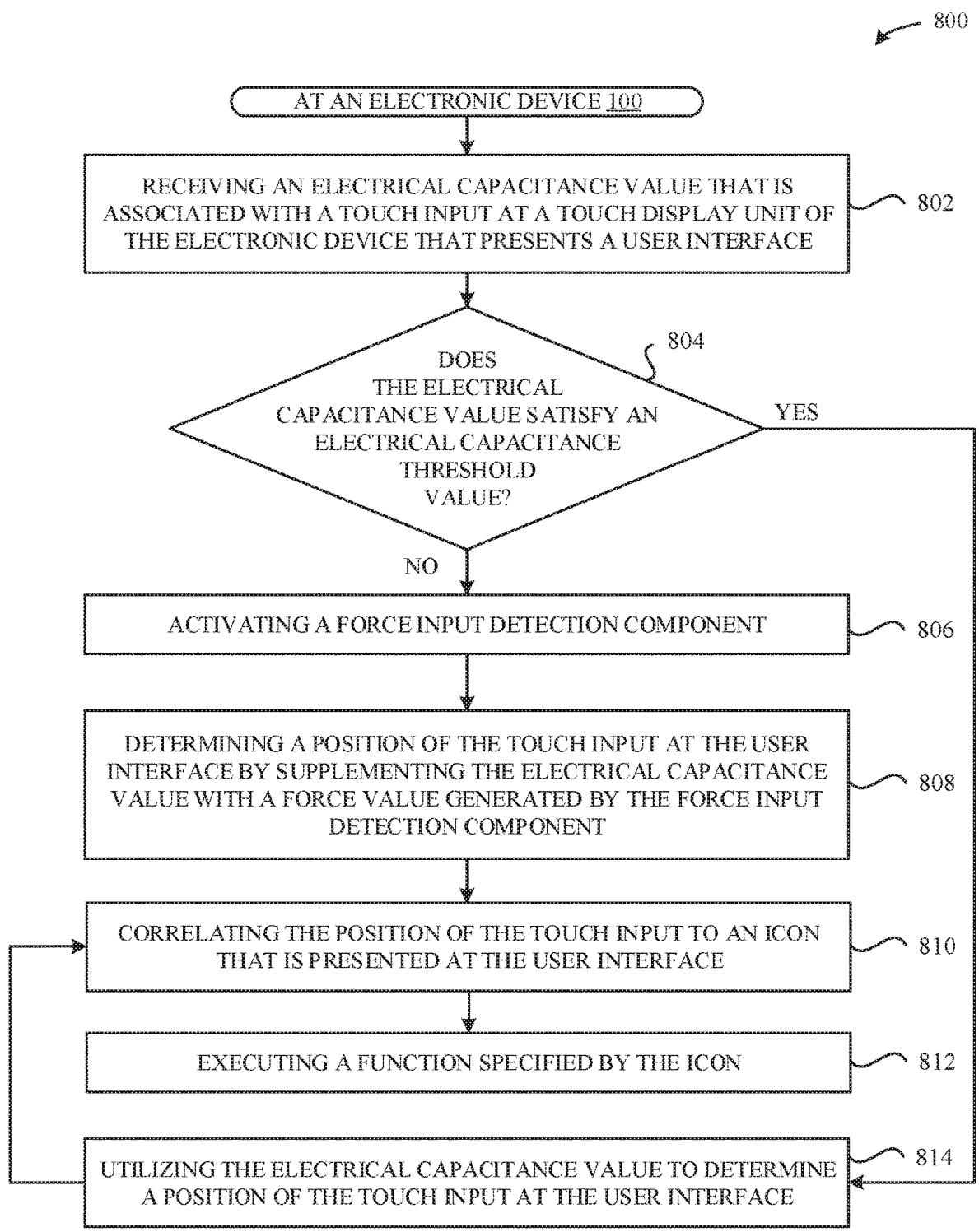
FIG. 8 illustrates a method for enabling an electronic device to execute specialized functionality in response to detecting a moisture event, according to some embodiments.

FIG. 8 illustrates a method 800 for enabling an electronic device to determine a position of a touch input event at a touch display unit, according to some embodiments. As illustrated in FIG. 8, the method 800 begins at step 802, where an electronic device—e.g., the electronic device 100—receives an electrical capacitance value that is associated with the touch input event at the cover layer 302 of the electronic device 100. In this example, the electronic device 100 may be solely relying upon the touch input detection component 304 to determine the position of the touch input event. Additionally, in some examples, measuring the electrical capacitance value can be beneficial in determining whether the electronic device 100 is exposed to a moisture event (e.g., water droplets on the cover layer 302, condensation formed on the cover layer 302, sweat on the cover layer 302, etc.) In other examples, the electrical capacitance value can be beneficial in determining that the electronic device is exposed to a challenging event (e.g., when the user is wearing non-capacitive gloves to operate the display module 310, etc.)

At step 804, the electronic device 100 can utilize the touch input detection component 304 to determine whether the electrical capacitance value satisfies an electrical capacitance threshold value. In some cases, the electronic device 100 may have previously established a table of specific electrical capacitance threshold values that are associated with different environmental conditions. As previously described herein, the electronic device 100 can establish different thresholds for different environmental events: (1) a baseline threshold when neither liquid nor the user's appendage are in contact with the cover layer 302, (2) a water detection threshold that is greater than the baseline threshold when liquid is present on the cover layer 302, and (3) a touch input event detection threshold that is greater than the water detection threshold when the user's appendage is in contact with the cover layer 302. In this example, the initial baseline value can have a capacitance threshold of 100 counts, the water detection threshold can have a capacitance threshold of 150 counts, and the touch input event detection threshold can have a capacitance threshold of 170 counts. If the electrical capacitance value is between the water detection threshold and the touch input event detection threshold, then the electronic device 100 can activate the force input detection component 308 to determine the position of the touch input event.

At step 806, in response to determining that the electrical capacitance value does not satisfy the electrical capacitance threshold tolerance value, the electronic device 100 can activate a force input detection component 308 to determine a centroid of the force associated with the touch input at the cover layer 302. In some cases, the force input detection component 308 can augment the touch input detection component 304 in order to accurately determine the position of the touch input at the cover layer 302. As previously described herein, the electrical capacitance value may be less than the touch input event detection threshold. Thus, the electronic device 100 can utilize the force input component 308 to confirm the position as determined by the touch input detection component 304.

At step 808, the electronic device 100 can determine the position of the touch input event by utilizing the respective detection signals provided by the force input detection component 308 and the touch input detection component 304. In some examples, the electronic device 100 can associate a respective confidence score to each of the coordinates of the sensing electrodes and force sensors. In turn, the electronic device 100 can apply a weighted score (based on the respective confidence score) to each of the positions. Beneficially, in this manner, when the electronic device 100 determines that the position determined by the force input detection component 308 is more reliable than the touch input detection component 304, then the electronic device 100 can rely more heavily on this determined position. Additionally, the position as determined by the force input detection component 308 can compensate for a lack of confidence in the position of the touch input as determined by the touch input detection component 304.

At step 810, the electronic device 100 can correlate the position of the touch input event at the cover layer 302 to at least one icon that is included in the user interface. In turn, the electronic device 100 can execute a function specified by the at least one icon that is selected by the touch input event, as indicated by step 812.

Returning back to step 804, if the electronic device 100 determines that the electrical capacitance value satisfies the electrical capacitance tolerance value, then the electronic device 100 can determine that the touch input detection component 304 is sufficiently capable in determining the position of the touch input event at the cover layer 302, as indicated by step 814.

Subsequently, the electronic device 100 can correlate the position of the touch input event at the cover layer 302 to the at least one icon that is included in the user interface, as indicated by step 810. In turn, the electronic device 100 can execute a function specified by the at least one icon that is selected by the touch input event, as indicated by step 812.

Figure 9:
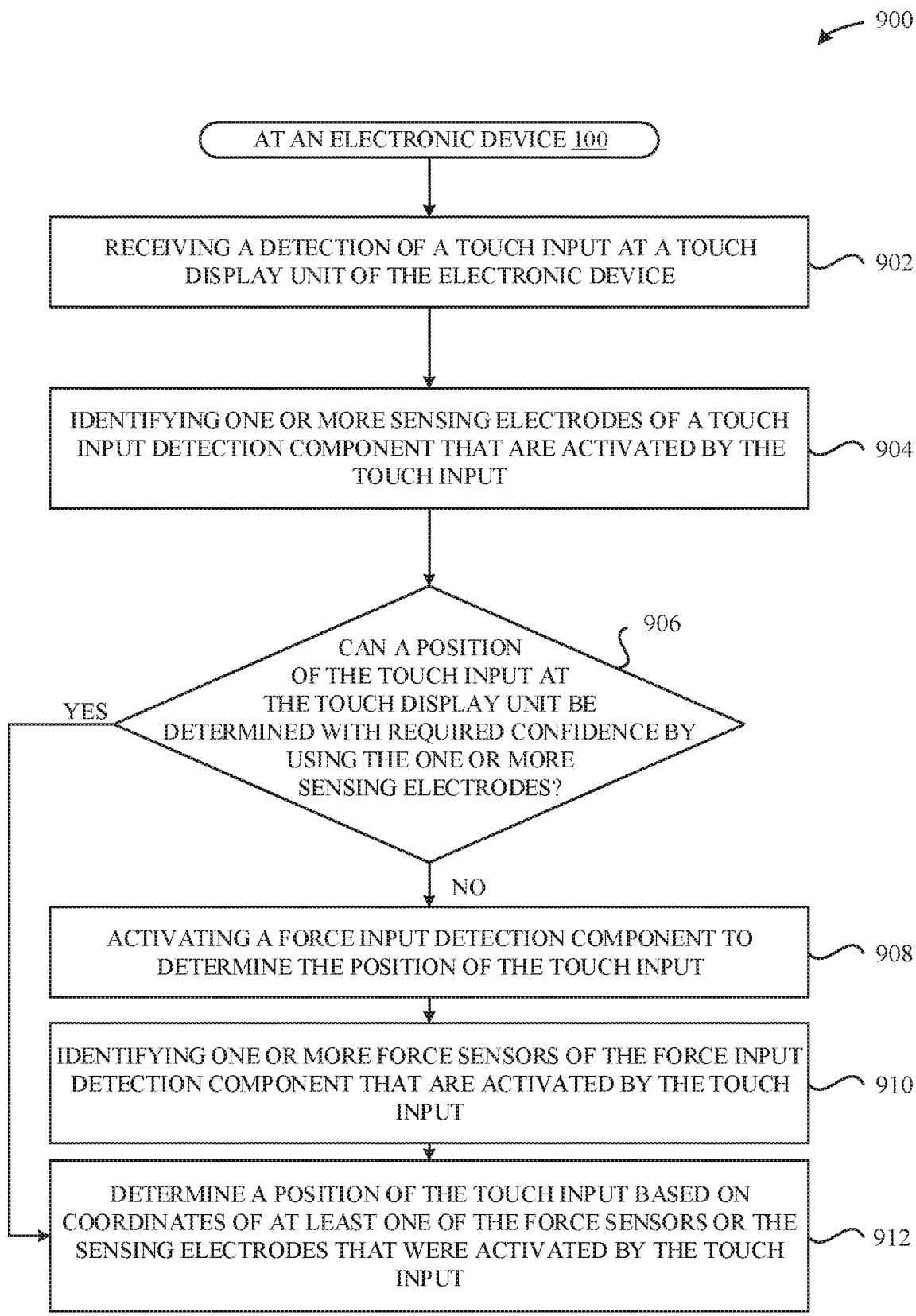
FIG. 9 illustrates a method for enabling an electronic device to execute specialized functionality in response to detecting a moisture event, according to some embodiments.

FIG. 9 illustrates a method 900 for enabling an electronic device to determine a position of a touch input at a display module 310, according to some embodiments. As illustrated in FIG. 9, the method 900 begins at step 902, where an electronic device—e.g., the electronic device 100—receives a position of a touch input event at the cover layer 302 of the electronic device 100. In some examples, the electronic device 100 can determine whether a confidence score for the one or more positions (corresponding to specific sensing electrodes that are activated) that are used to form the position for the touch input event satisfies a confidence threshold level. In this example, the electronic device 100 may be solely relying upon the touch input detection component 304 to determine the position of the touch input event. Additionally, in some examples, measuring the electrical capacitance value can be beneficial in determining whether the electronic device 100 is exposed to a moisture event (e.g., water droplets on the cover layer 302, condensation formed on the cover layer 302, sweat on the cover layer 302, etc.)

At step 904, the electronic device 100 can identify the one or more sensing electrodes 318 of the touch input detection component 304 that are activated by the touch input event. As previously described herein, each of the sensing electrodes 318 can include a baseline electrical capacitance value. When the user's appendage comes into contact with the cover layer 802, the user's appendage functions as a capacitor that can modify the electrical capacitance value of each of the sensing electrodes 318 that are in proximity to the user's appendage. In turn, the user's appendage can function as a capacitive element that forms a capacitive circuit with the sensing electrodes 318.

As indicated by step 906, the electronic device 100 can determine whether the position of the touch input event can be determined with required confidence by the sensing electrodes 318. In some examples, if the electrical capacitance value for the activated sensing electrodes 318 exceeds a touch input event detection threshold, then the electronic device 100 can conclude that the position of the touch input event can be determined with the requisite confidence score. However, if the electrical capacitance value is greater than a water detection threshold, but less than the touch input event detection threshold, then the electronic device 100 may have low confidence in the position of the touch input event.

At step 908, in response to determining that the position of the touch input event cannot be determined with the requisite confidence level, then the electronic device 100 can activate the force input detection component 308, as indicated by step 908. In turn, the electronic device 100 can determine which of the one or more force sensors 320 of the force input detection component 308 are activated by the touch input event, as indicated by step 910.

Subsequently, at step 912, the electronic device 100 can determine a position of the touch input event at the cover layer 302 based on at least one of the coordinates of the force sensors 320 of the force input detection component 308 or the sensing electrodes 318 of the touch input detection component 304 that are activated. In some examples, the electronic device 100 can associate a respective confidence score to each of the respective detection signals provided by the force sensors 320 and the sensing electrodes 318. In turn, the electronic device 100 can apply a weighted score (based on the respective confidence score) to each of the positions or coordinates that form the basis for the position.

Returning back to step 906, if the electronic device 100 can determine the position of the touch input event with the requisite confidence level based solely on the sensing electrodes 318 of the touch input detection component 304, then the electronic device 100 can determine the position of the touch input event, as indicated by step 912.

Figure 10:
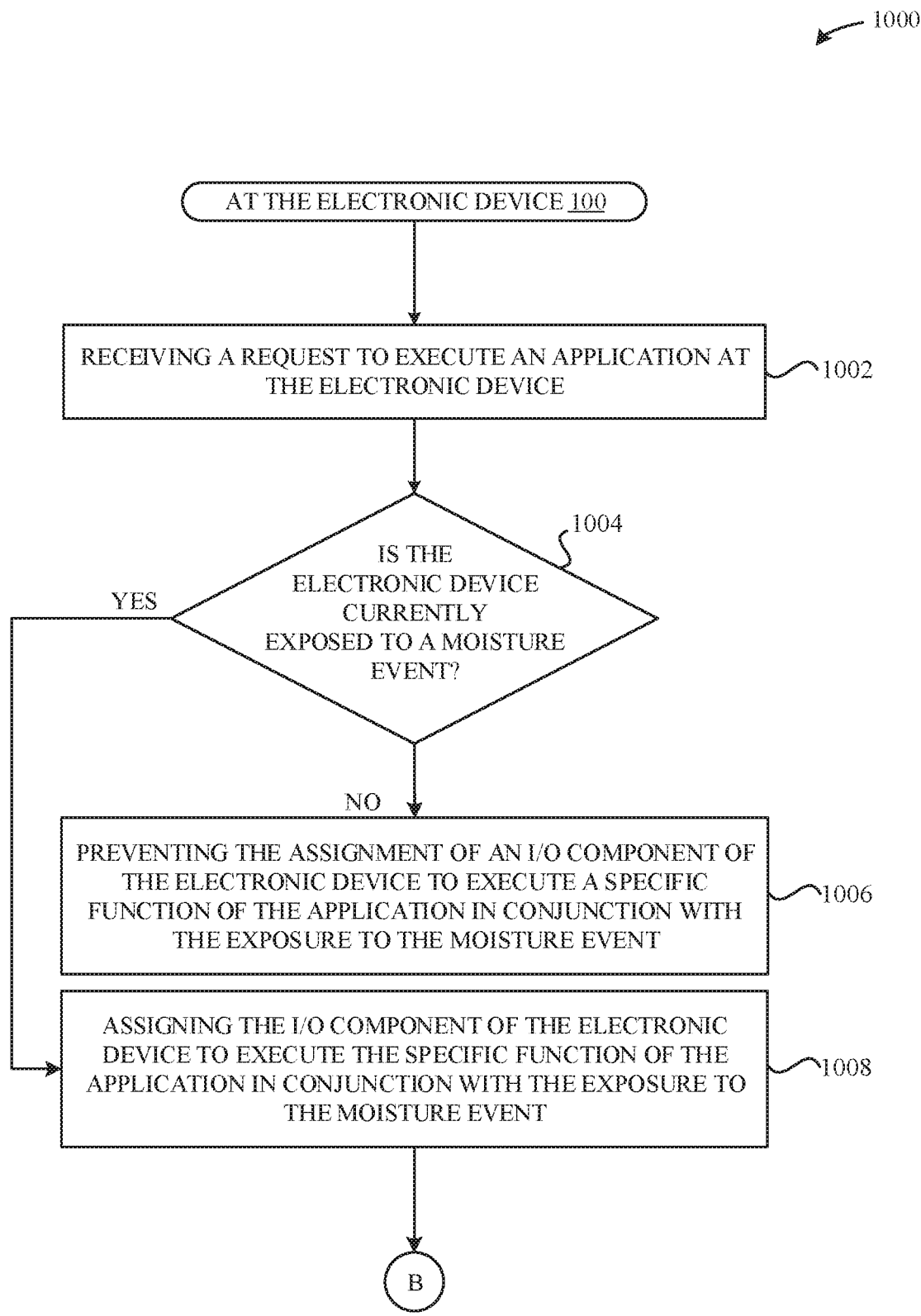
FIG. 10 illustrates a method for enabling an electronic device to execute specialized functionality in response to detecting a moisture event, according to some embodiments.

FIG. 10 illustrates a method 1000 for assigning a specific function to an I/O component—the I/O component 166—of the electronic device 100, according to some embodiments. As illustrated in FIG. 10, the method 1000 begins at step 1002, where the electronic device—e.g., an electronic device 100—receives a request to execute an application at the electronic device 100. This can occur, for example, subsequent to the electronic device 100 activating a force input detection component 308 in response to detecting that the electronic device 100 is exposed to a moisture event. In some examples, the application can refer to a camera application, a photo library, a video camera application, a media player application, a media application, a web browser, and the like.

At step 1004, the electronic device 100 can determine whether the electronic device 100 is currently exposed to a moisture event, as previously described herein. In some examples, the electronic device 100 can differentiate between different types of moisture events. For example, the electronic device 100 can execute different functionalities when the electronic device 100 is submerged underwater as opposed to when the electronic device 100 is exposed to rain or sweat.

At step 1006, in response to determining that the electronic device 100 is not currently exposed to the moisture event, the electronic device 100 can prevent assigning an I/O component 166 (e.g., a soft key) to execute a specific function of the application in conjunction with the moisture event. As described in greater detail herein, in certain instances, the presence of the moisture event can hinder or prevent certain functionalities from being executed by the electronic device 100. For example, if the electronic device 100 is submerged underwater, then taking photographs using the display module 310 can be significantly more difficult to execute. However, the electronic device 100 can compensate for such deficiencies by assigning the I/O component 166 with specific functions that facilitate underwater photography.

Returning back now to step 1004, if the electronic device 100 determines that the electronic device 100 is currently exposed to the moisture event, then the electronic device 100 can assign the I/O component 166 to execute the specific function of the application, as indicated by step 1008. Referring to the example where the application refers to a camera/video application, the electronic device 100 can enable the I/O component 166 to toggle the electronic device 100 between a camera mode and a video mode, when the I/O component 166 is actuated between the first and second positions, respectively. In turn, the method 1000 can proceed to the method 1400 of FIG. 14, which is described below in greater detail.

Figure 11A:
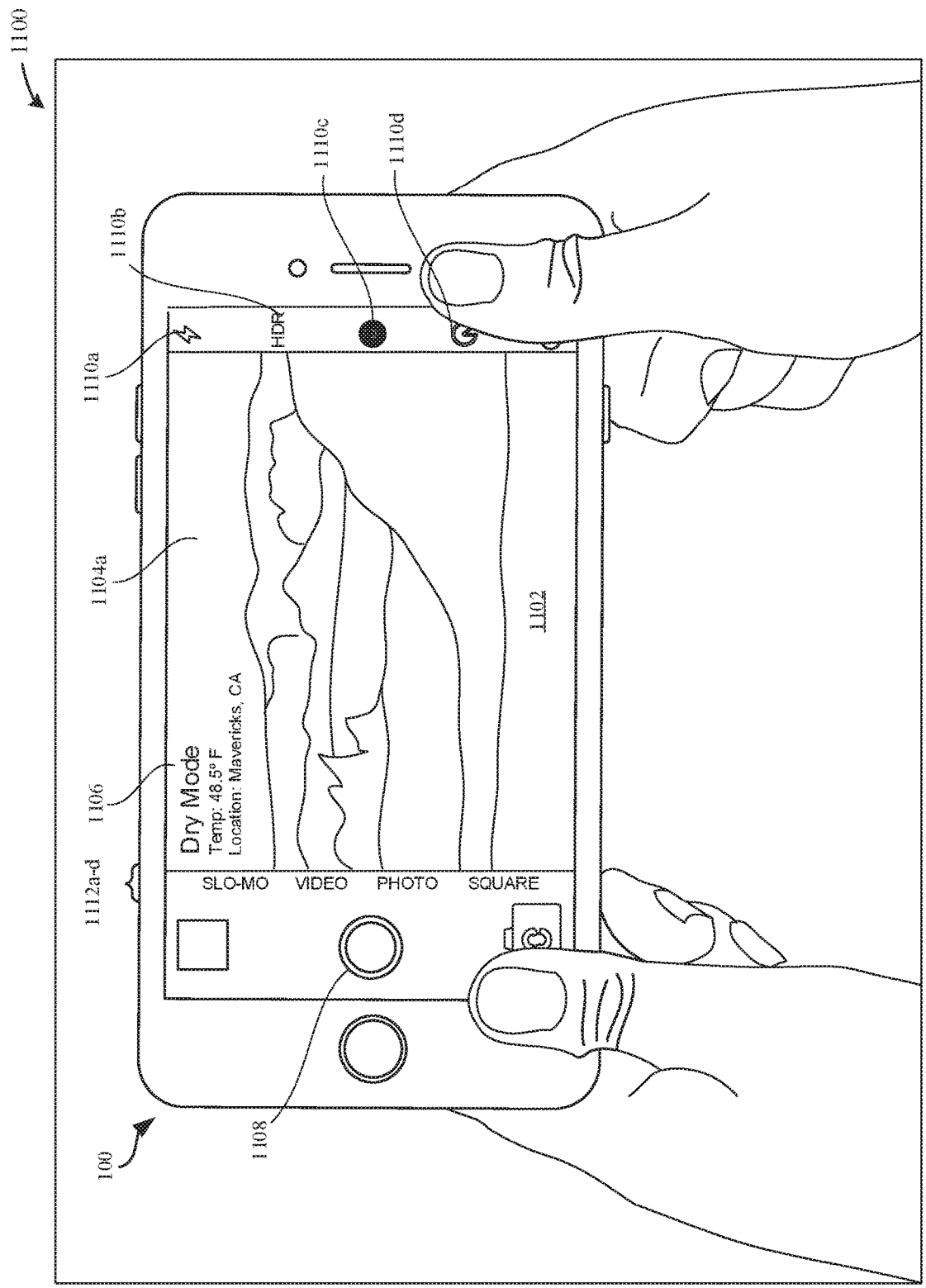
FIGS. 11A-11C illustrate conceptual diagrams of example user interfaces that can be configured to provide specialized functionality, according to some embodiments.
Figure 11B:
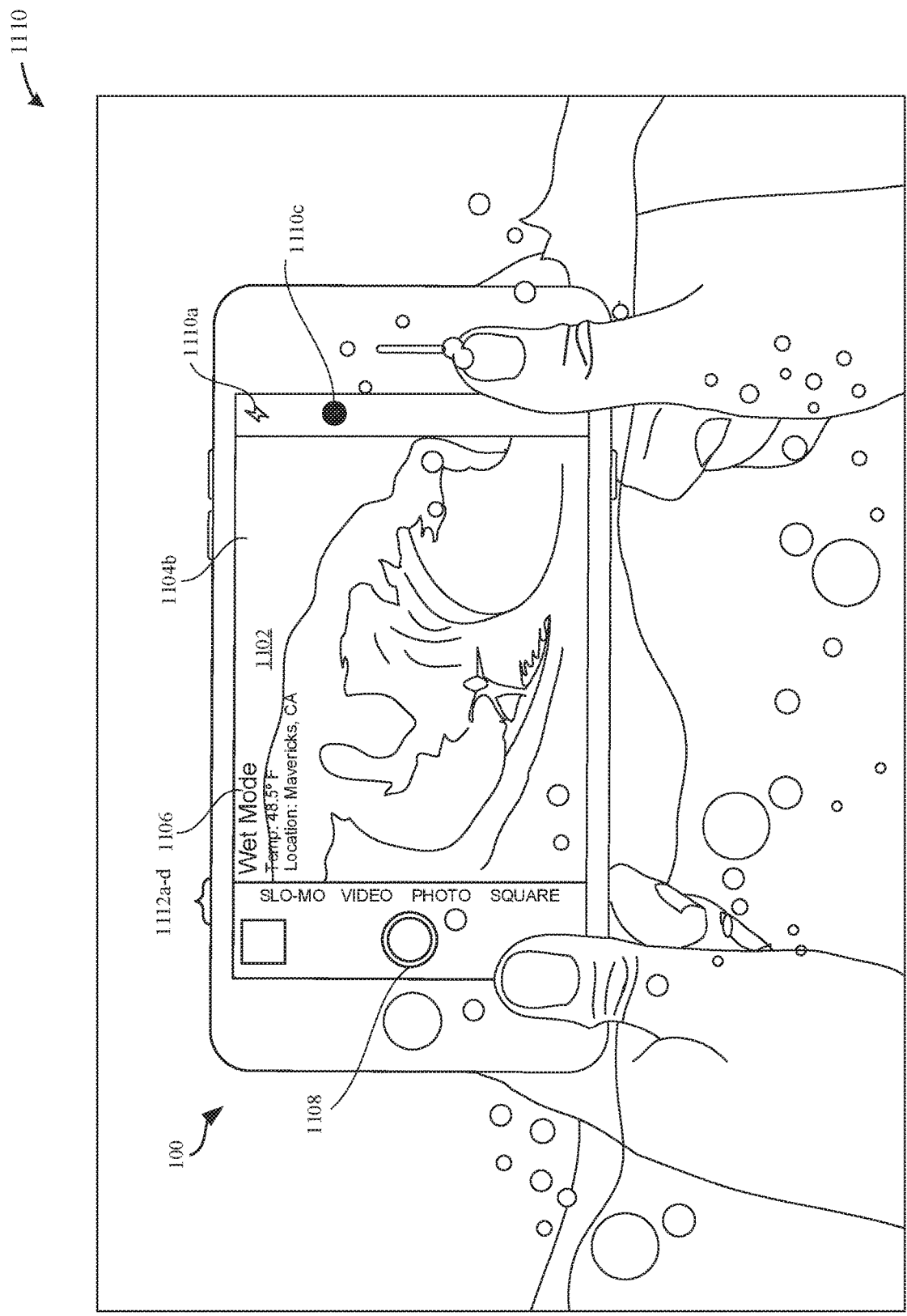
Figure 11C:
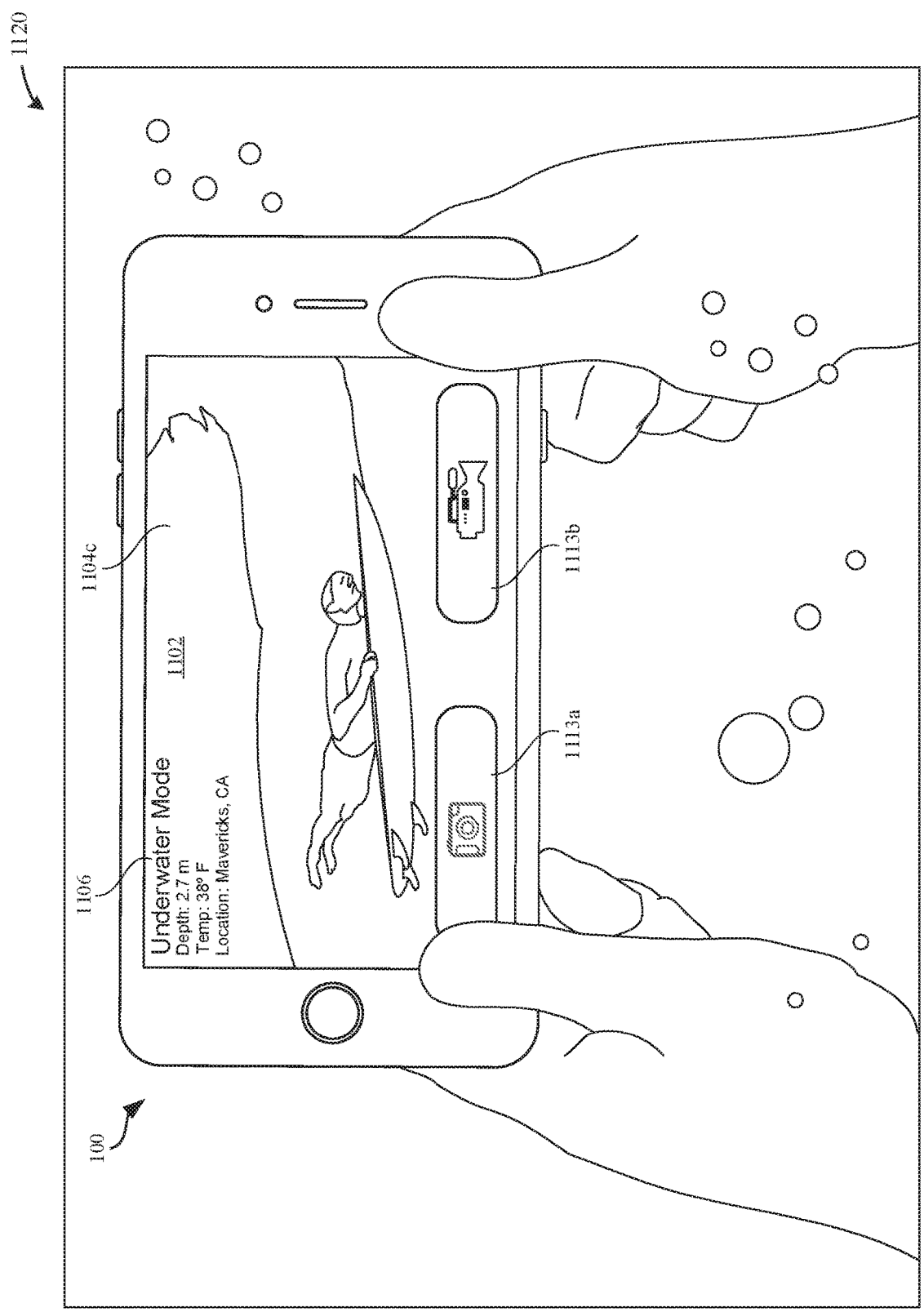

FIGS. 11A-11C illustrate conceptual diagrams of example user interfaces that can be implemented at the electronic device—e.g., electronic device 100—in response to exposing the electronic device 100 to different moisture event types, according to some embodiments. For example, as illustrated in FIGS. 11A-11C, the electronic device 100 can present different user interfaces 1104a-c in response these different moisture event types.

As illustrated in conceptual diagram 1100 of FIG. 11A, the electronic device 100 can present a user interface 1104a that is associated with the camera application. For example, the user interface 1104a can present a live image of the surf break, Mavericks. For example, the electronic device 100 is being utilized by a user to take a photograph of Mavericks. In this example, the user interface 1104a can present an indication 1106 that the electronic device 100 is not exposed to a moisture event (i.e., dry mode), as previously described herein. In conjunction with presenting the user interface 1104a for the camera application, the electronic device 100 can present a shutter icon 1108 that when selected by the touch input event can cause the camera unit 190 to take a photograph of the current live image of the surf break. Additionally, the user interface 1104a can include a first set of different icons 1110a-d that can be configured to execute specific camera processing functions in conjunction with the dry mode. For example, the first set of different icons 1110a-d can include a flash module 1110a, a High-Dynamic Range (HDR) setting 1110b, color tone settings 1110c, a shutter delay 1110d, and so forth. Additionally, the user interface 1104a can include a second set of different icons 1112a-d that can be configured to execute specific photography modes in conjunction with the dry mode. For example, the second set of different icons 1112a-d can include a slow-motion photography mode 1112a, a video mode 1112b, a photo mode 1112c, a square photograph mode 1112d, and so forth.

According to some embodiments, the electronic device 100 can dynamically adjust one or more settings of the display 1102 such as to optimize the user interface 1104a to become more clear and detailed during the dry mode. For example, the electronic device 100 can utilize the environmental sensor 180 (e.g., ambient light sensor) to determine ambient light environmental conditions. In response to determining that there is less than an ambient light threshold value detected, the electronic device 100 can be configured to enhance the brightness of the display 1102/enhance contrast of the display 1102 so as to improve the clarity of the user interface 1104a. Additionally, in some cases, the specific arrangement of the first and second set of icons 1110a-d, 1112a-d can be unique to the dry mode. Furthermore, in some cases, the specific icons 1110a-d, 1112a-d that are included in the user interface 1104 can be specific to the dry mode. For example, the High-Dynamic Range (HDR) setting 1110b may be only available in conjunction with the electronic device 100 operating in dry mode. According to some embodiments, the electronic device 100 can implement automatic camera/video settings that are optimal for executing functions during the dry mode. For example, the color tone setting 1110c can apply a UV filter in order to reduce the glare of the sun. In another example, the color tone setting 1110c can reduce brightness in objects.

As illustrated in FIG. 11A, the electronic device 100 can be configured to determine that it is not exposed to a moisture event. As a result, the electronic device 100 can prevent the force input detection component 308 from being activated. In other words, the icons of the user interface 1104a can be selected solely by utilizing the touch input detection component 304.

As illustrated in conceptual diagram 1110 of FIG. 11B, the electronic device 100 can present a user interface 1104b that is associated with the camera application. For example, the user interface 1104b can present a live image of a surfer who is surfing a 30-foot wave at Mavericks. While in the water, the electronic device 100 can be subjected to different environmental conditions, such as increased water pressure, liquid ingress, condensation, and rapid temperature changes. These different environmental conditions can impose significant demands on the electronic device 100 and affect its capability to take the photographs of the surfer. As previously described herein, the electronic device 100 can determine whether it is exposed to a moisture event (e.g., water spray, condensation, water droplets, etc.). As illustrated in FIG. 11B, the electronic device 100 is currently exposed to saltwater and water droplets. In this example, the user interface 1104b can present an indication 1106 that the electronic device 100 is exposed to a moisture event (e.g., wet mode). In conjunction with presenting the user interface 1104b in conjunction with the moisture event, the electronic device 100 can modify at least one of the first or second set of icons that are presented at the user interface 1104b. For example, only the flash module 1110a and the color tone settings 1110c are included in the user interface 1104b. Additionally, these aforementioned icons are provided in a different arrangement. Moreover, the electronic device 100 can dynamically adjust one or more settings of the display 1102 such as to optimize the user interface 1104b to become more clear and detailed during the wet mode. For example, the electronic device 100 can dynamically boost the clarity of the icons included in the user interface 1104b such as to make each icon more visually distinctive.

As illustrated in FIG. 11B, the electronic device 100 can determine that the performance of the touch input detection component 304 has been impacted by the moisture event (e.g., wet mode), and that the position of the touch input cannot be satisfactorily determined solely relying upon the touch input detection component 304. Accordingly, as previously described herein, the electronic device 100 can activate the force input detection component 308 to augment the touch input detection component 304 to determine the position of the touch input event. As previously described herein, the force input detection component 308 can be activated in response to determining that the electronic device 100 is exposed to the moisture event. Although the electronic device 100 is exposed to the moisture event, the electronic device 100 has not deactivated the touch input detection component 304 (i.e., relying solely on the force input detection component 308) as some degree of accuracy regarding the position of the touch input is still capable using the touch input detection component 304.

As illustrated in conceptual diagram 1120 of FIG. 11C, the electronic device 100 can present a user interface 1104c that is associated with the camera application. For example, the user interface 1104c can present a live image of a surfer who duck-dives beneath a 30-foot wave at Mavericks. As previously described herein, the electronic device 100 can determine that the electronic device 100 is exposed to a moisture event (e.g., submerged underwater). Accordingly, the user interface 1104c can present an indication 1106 that the current moisture event corresponds to an underwater mode. In conjunction with presenting the user interface 1104c in conjunction with the underwater mode, the electronic device 100 can modify at least one of the first or second set of icons that are presented at the user interface 1104c. For example, the user interface 1104c can present a simplified camera interface, where only a limited set of icons 1113a-b are presented. For example, the limited set of icons 1113a-b can include a photography icon 1113a and a video icon 1113b. Additionally, in contrast to the user interfaces 1104a-b, the user interface 1104c does not include a shutter icon 1108. Instead the user can select the photography icon 1113a to take a photograph and the video icon 1113b to capture a video of the live image. It should be noted that the size of these respective photography and video icons 1113a, 1113b are larger than their counterparts (e.g., 1112a-d) as illustrated in FIG. 11B. Additionally, white balance settings, ISO sensitivity, and clarity of the camera unit 190 can be dynamically adjusted in conjunction with any one of these moisture events.

According to some embodiments, the display settings can adjust the intensity (e.g., brightness) of the display 1102 in order to heat the electronic device 100 while it is submerged underwater. For example, increasing the display 1102 brightness can not only increase clarity while the electronic device 100 is submerged underwater, but can also utilize the thermal energy generated by the electronic device 100 to maintain the electronic device 100 within an optimal operating temperature. In some examples, the housing 114 of the electronic device 100 can be comprised of a metal, such as aluminum, which can act as a heat sink. In other cases, the electronic device 100 can increase the brightness of the display 1102 to take advantage of the thermal conductive properties of the surrounding underwater environment in order to facilitate cooling of the electronic device 100. In particular, because the liquid surrounds the electronic device 100, the liquid can promote cooling of the entire electronic device 100.

It should also be noted that other applications can also be presented in conjunction with any one of the aforementioned moisture events, where the electronic device 100 can be configured to present simplified user interfaces for these other applications. For example, the electronic device 100 can present a simplified user interface (e.g., enlarged icons) for a health kit applications, such as an application for monitoring the user's heart rate or blood pressure during exercise while the electronic device 100 is exposed to the moisture event. In this manner, the user can more easily execute specific functions for these applications at the electronic device 100.

As previously described herein, the electronic device 100 can dynamically adjust one or more settings of the display 1102 such as to optimize the user interface 1104c to become more clear and detailed during the submerged mode. For example, there is a scarcity of natural light that is available while submerged. Accordingly, the electronic device 100 can dynamically boost the brightness and the color contrast of the display 1102 in order to make the user interface 1104c more clear.

According to some embodiments, when the electronic device 100 is in the submerged mode, the touch input detection component 304 can be disabled by the electronic device 100. Instead the electronic device 100 can rely solely upon the force input detection component 308 to determine a position of the touch input event at the display 1102. Thus, the processor (not illustrated) can ignore any detection signal associated with the position of the touch input event that is provided by the touch input detection component 304 when the electronic device 100 determines that it is submerged in the water, while relying solely upon the detection signal provided by the force input detection component 308. As illustrated in FIG. 11C, the water is sufficiently cold at 38° Fahrenheit (as determined by the environmental sensor 180) that necessitates that the user wear wetsuit gloves while operating the user interface 1104c of the electronic device 100 while submerged. Accordingly, although the wetsuit gloves could impact the ability of the electronic device 100 to determine the position of the user input in conjunction with the dry mode/wet mode, the force input detection component 308 can be configured to determine with requisite accuracy the position of the touch input event despite the user wearing wetsuit gloves. Additionally, it is noted that the wetsuit gloves are generally made of non-conductive material. Moreover, the capability of the force input detection component 308 to determine the position of the wetsuit gloves can also be applied to other types of gloves such as biker gloves. It is noted that the electronic device 100 can be configured to determine an accurate position of the touch input even while the user is wearing a non-conductive glove in any one of the aforementioned types of moisture event modes.

Figure 12:
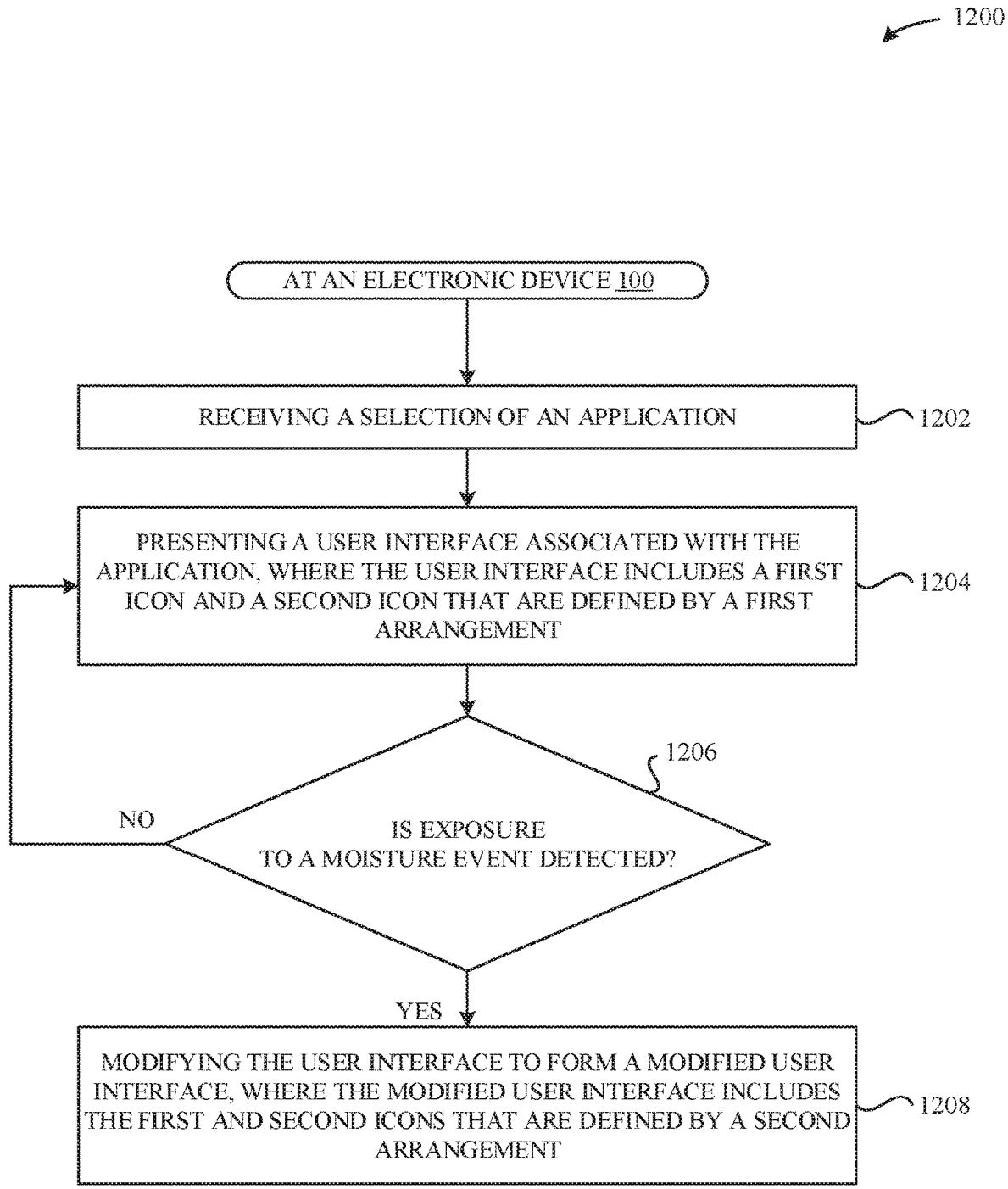
FIG. 12 illustrates a method for enabling an electronic device to execute specialized functionality in response to detecting a moisture event, according to some embodiments.

FIG. 12 illustrates a method 1200 for presenting a user interface at an electronic device in response to determining that the electronic device is exposed to a moisture event, according to some embodiments. As illustrated in FIG. 12, the method 1200 begins at step 1202, where an electronic device—e.g., the electronic device 100—receives a selection of an application (e.g., camera application, photo library, maps, music library, etc.) that is included in the user interface that is presented by the electronic device 100. For example, if a music player is selected while the electronic device 100 is exposed to the moisture event, the electronic device 100 can dynamically adjust the audio playback of the music to enable for listening underwater/wet.

At step 1204, the electronic device 100 can present the user interface that is associated with the application that was selected by the user. In some cases, the user interface can include at least a first icon and a second icon, where the first and second icons are defined by a first arrangement. In some examples, the user interface that is presented by the electronic device 100 can be associated with a non-moisture event (e.g., a dry mode).

At step 1206, the electronic device 100 can determine whether an exposure to the moisture event is detected. As previously described herein, the electronic device 100 can utilize a combination of at least one of the environmental sensor 180, an electrical capacitance value measured by the display module 310, or other sensor to determine whether the electronic device 100 is exposed to the moisture event.

At step 1208, in response to the electronic device 100 determining that the moisture event is detected, the electronic device 100 can modify the user interface that is associated with the application to form a modified user interface. In some cases, the modified user interface can include at least the first and second icons, where the first and second icons are defined by a second arrangement that is different from the first arrangement. Returning back to step 1206, if the electronic device 100 determines that the exposure to the moisture event is not detected, then the electronic device 100 can continue to present the user interface that is associated with the non-moisture event. Subsequently, the electronic device 100 can continue to monitor for the moisture event.

Figures 13A, 13B:
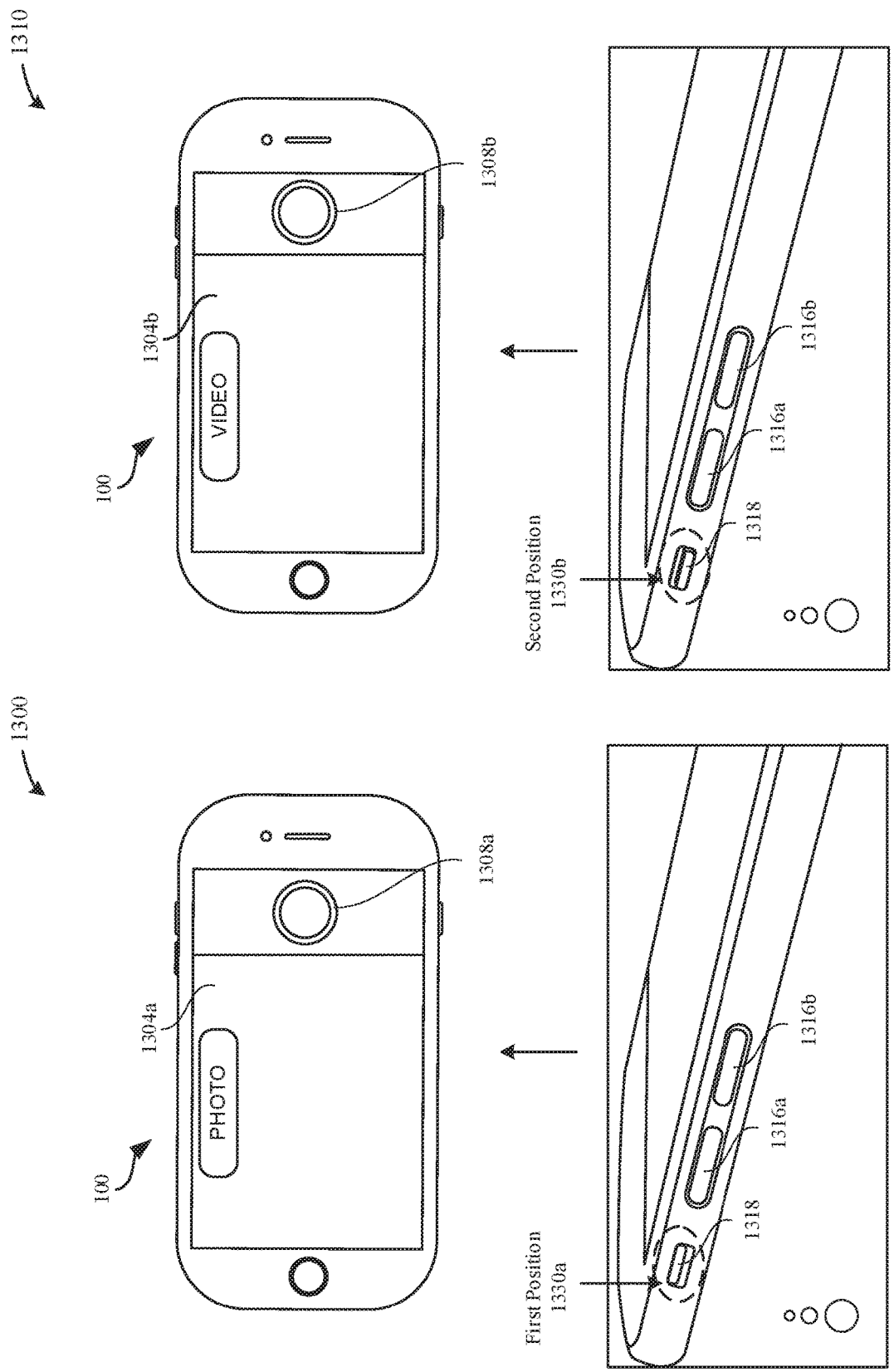
FIGS. 13A-13B illustrate example conceptual diagrams of executing specialized functionality in response to detecting a moisture event, according to some embodiments.

FIGS. 13A-13B illustrate conceptual diagrams of example user interfaces that can be implemented at the electronic device—e.g., electronic device 100—in response to actuating an I/O component—the I/O component 166, according to some embodiments. For example, as illustrated in FIGS. 13A-13B, the electronic device 100 can modify a user interface in response to toggling the I/O component 166 between different positions during a moisture event. This can occur, for example, subsequent to the electronic device 100 assigning the I/O component 166 of the electronic device 100 with a specific function that is associated with an application in response to determining that the electronic device 100 is exposed to the moisture event (described in conjunction with FIG. 10).

FIG. 13A illustrates a conceptual diagram 1300 of the electronic device 100 that is currently exposed to the moisture event (e.g., underwater), according to some embodiments. As previously described herein, when the electronic device 100 is submerged, certain functionalities of the electronic device 100 may be more difficult to execute. As illustrated in FIG. 13A, the electronic device 100 can include an I/O component—e.g., a slide-switch 1318—that can be configured to be actuated between a first position 1330a and a second position 1330b. In particular, the slide-switch 1318 can be configured to execute respective specific function in conjunction with each of the first and second positions. Additionally, the electronic device 100 can include another I/O component—e.g., a rocker switches 1316a-b—that can be configured to be actuated between a first end and a second end of the rocker switch 1316a-b. In this example, the slide-switch 1318 is assigned a specific function that is associated with a camera/video application. In response to a user actuating the slide-switch 1318 in the first position 1330a, the electronic device 100 can be configured to present a camera interface 1304a. Furthermore, the rocker switches 1316a-b can be configured to actuate between the first and second ends, respectively, in order to zoom-in/zoom-out of a live image that is presented by the electronic device 100. Additionally, the camera interface 1304a can include a shutter icon 1308a that causes the camera unit 190 to take a photograph.

FIG. 13B illustrates a conceptual diagram 1310 of the electronic device 100 that is currently exposed to the moisture event (e.g., submerged). As illustrated in FIG. 13B, the slide-switch 1318 is actuated by the user to the second position 1330b. In response to actuating the slide-switch 1318 to the second position 1330b, the electronic device 100 can be configured to present a video camera interface 1304b. Furthermore, in response to actuating the slide-switch 1318 to the second position 1330b, the electronic device 100 can also be configured to assign the rocker switches 1316a-b with a specific function in conjunction with the electronic device 100 executing video camera functions. In some examples, the rocker switches 1316a-b can be configured to actuate between the first and second ends of the rocker-switch 1316a-b, respectively, in order to function as an I/O component lock/I/O component unlock. In this example, the electronic device 100 can prevent the user from accidentally stopping an ongoing video recording. In other examples, the rocker switches 1316a-b can be configured to zoom-in/zoom-out of a live image regardless of whether the slide-switch 1318 is in the first position 1330a or the second position 1330b. Additionally, the video camera interface 1304b can include a video capture icon 1308b that causes the camera unit 190 to take a video.

Figure 14:
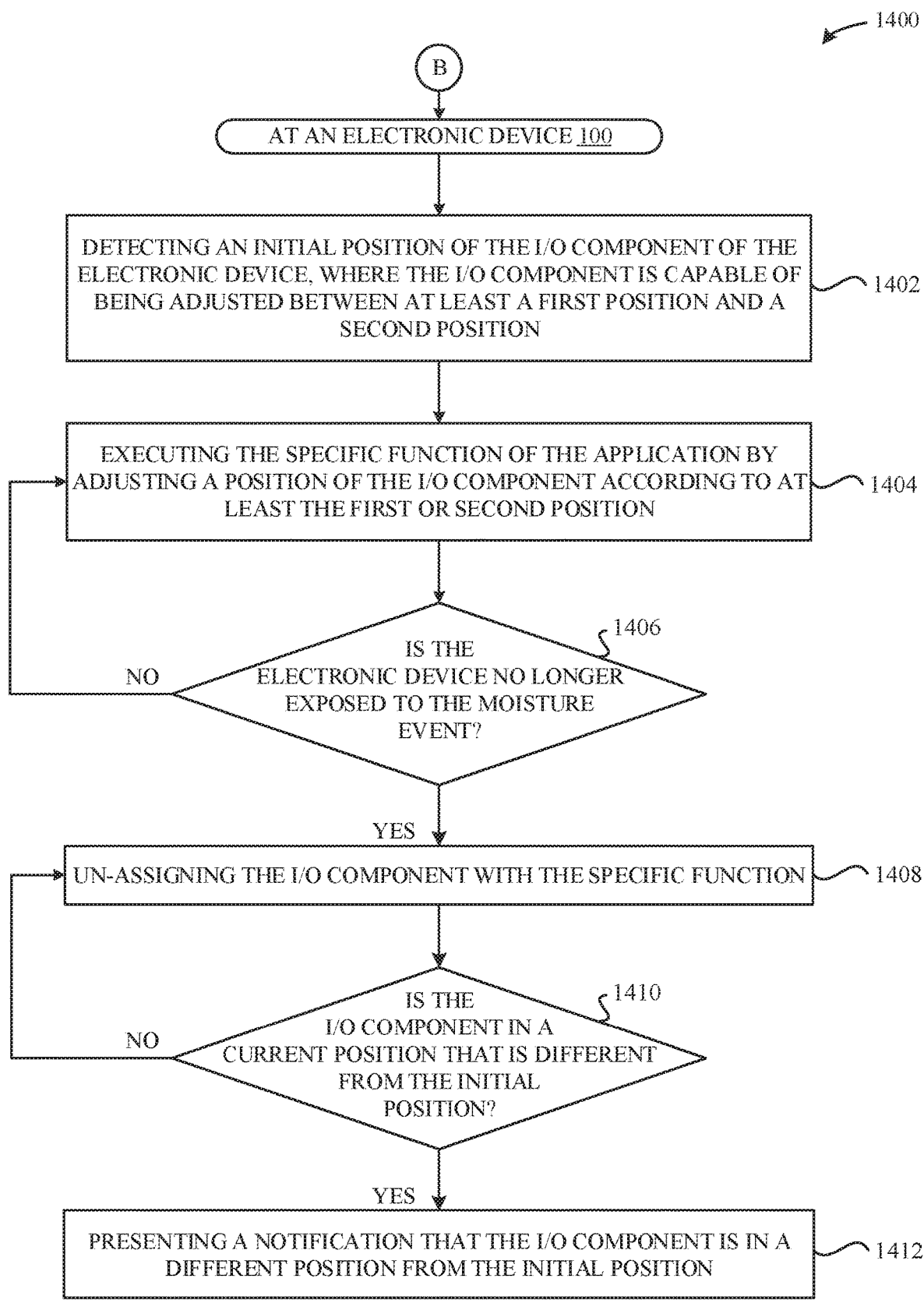
FIG. 14 illustrates a method for enabling an electronic device to execute specialized functionality in response to detecting a moisture event, according to some embodiments.

FIG. 14 illustrates a method 1400 that can extend the method 1000 (described in conjunction with FIG. 10). The method 1400 involves un-assigning a specific function to an I/O component 166 in response to determining that the electronic device is no longer exposed to a moisture event. The method 1400 can occur, for example, subsequent to the electronic device 100 assigning the I/O component 166 with the specific function in response to determining that the electronic device 100 is exposed to the moisture event. As illustrated in FIG. 14, the method 1400 begins at step 1402, where the electronic device 100 detects an initial position of an I/O component 166 of the electronic device 100. In some cases, the I/O component 166 can be configured to be adjusted between a first position and a second position, as previously described herein.

At step 1404, the electronic device 100 can execute the specific function of an application (e.g., video camera application, search mode, etc.) by toggling the I/O component 166 in either the first position or the second position. At step 1406, the electronic device 100 can determine whether the electronic device 100 is no longer exposed to the moisture event. As previously described herein, the electronic device 100 can utilize a combination of at least one of the environmental sensor 180 or an electrical capacitance value measured by the display module 310 to determine whether the electronic device 100 remains exposed to the moisture event. At step 1408, if the electronic device 100 determines that it is no longer exposed to the moisture event, then the electronic device 100 can un-assign the specific function to the I/O component 166. In turn, the electronic device 100 can determine whether a current position of the I/O component 166 is different from the initial position of the I/O component 166, as indicated by step 1410.

Returning back to step 1408, if the electronic device 100 determines that the electronic device 100 remains exposed to the moisture event, then the electronic device 100 can continue to assign the specific function to the I/O component 166.

At step 1412, if the electronic device 100 determines that the current position of the I/O component 166 is different than the initial position, then the electronic device 100 can present a notification to the user in accordance with this change in position. As previously described herein, the I/O component 166 can be configured to toggle the electronic device 100 between a silent mode (or "Do-not-Disturb" mode) and an "Audible Notification" mode. Beneficially, in this manner, if the I/O component 166 is in a changed position, the electronic device 100 can provide the user with an opportunity to revert the I/O component 166 to the position as intended by the user. Returning back to step 1410, if the electronic device 100 determines that the current position of the I/O component 166 is identical to the initial position, then the electronic device 100 can prevent the notification from being presented to the user.

Figure 15:
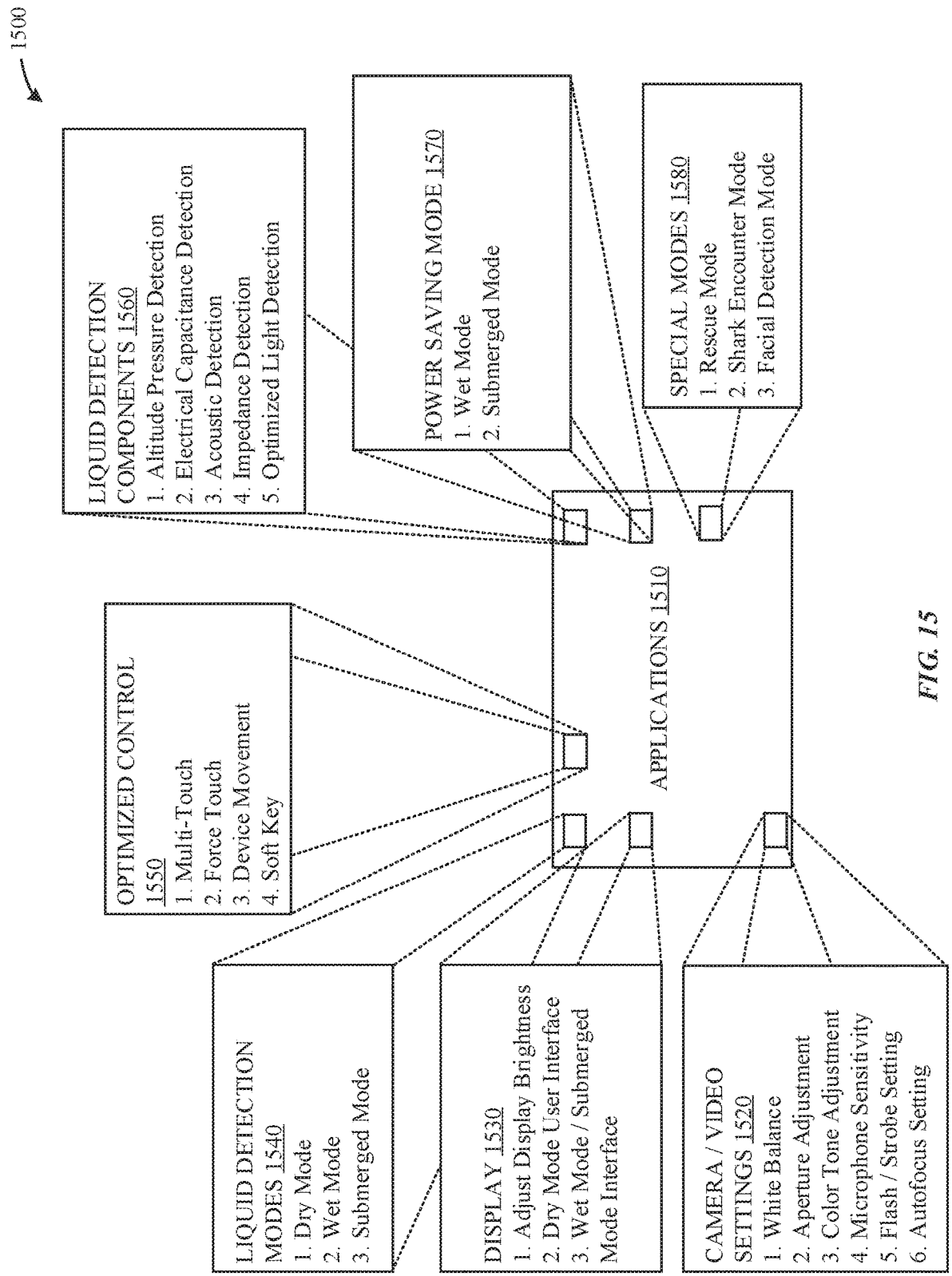
FIG. 15 illustrates a system of an exemplary list of specialized functions that can be implemented by an electronic device, according to some embodiments.

FIG. 15 illustrates a system 1500 of an exemplary list of applications that can execute specific functions at the electronic device 100, according to some embodiments. In some cases, the exemplary list of applications 1510 can be established in the at least one memory and can be subsequently executed by the at least one processor, as described in greater detail in FIG. 16. As illustrated in FIG. 15, the exemplary list of applications 1510 can include "Camera/Video Settings" 1520, "Display" 1530, "Liquid Detection Modes" 1540, "Optimized Control" 1550, "Liquid Detection Components" 1560, "Power Savings Mode" 1570, and "Special Modes" 1580.

In some examples, the "Camera/Video Settings" 1520 can include specific settings that are optimal for taking photographs and capturing video. In particular, the examples can include: (1) "White Balance Settings," (2) "Aperture Adjustment," (3) "Color Tone Adjustment," (4) "Microphone Sensitivity," (5) "Flash/Strobe Setting," and (6) "Autofocus Setting." In some examples, the electronic device 100 can adjust the sensitivity of the acoustic detection unit 172 (e.g., microphone) depending on whether the electronic device 100 is exposed to a moisture event/non-moisture event. Indeed, sound waves can travel faster through a liquid (e.g., water) than in a gas (e.g., air). Thus, the electronic device 100 can reduce the sensitivity of the microphone while the electronic device 100 is submerged in order to prevent generally "white noise" (e.g., bubbles, snorkeling sound, button clicks, toggling switches, breathing, etc.) from becoming magnified. In some examples, the "Flash/Strobe Setting" can adjust the flash module of the camera unit 190 to enhance underwater photography/video taking. Indeed there is far less natural light that is available when the electronic device 100 is submerged underwater. Accordingly, in response to determining that the electronic device 100 is in the submerged mode, the electronic device 100 can boost the intensity of the flash module. In some examples, the "Autofocus Setting" can take into account the different refractive index between air (~1.0) and water (~1.3) when enabling the camera unit 190 to auto-focus on a subject. In another example, the environmental sensor 180 (e.g., pressure sensor) can determine whether the electronic device 100 is submerged in cold water. In response, the environmental sensor 180 can provide a detection signal to the processor (not illustrated) to cause the electronic device 100 to dynamically boost the intensity of the flash module to enable underwater photography/live image view.

In some examples, the "Optimized Control" 1550 can include specific settings for executing specific user functions of the electronic device 100. In particular, the examples can include: (1) "Multi-Touch," (2) "Force Input," (3) Device Movement," and (4) "I/O component." In one example, when the "Force Input" setting is executed, the electronic device 100 can increase the sensitivity of detecting the force input when the electronic device 100 is exposed to a moisture event. In one example, the electronic device 100 can utilize the environment sensor 180 (e.g., accelerometer) to determine an orientation of the electronic device 100 with up to 6-degrees of freedom (6-DOF). In particular, specific orientations and movements of the electronic device 100 can correspond with executing specific functions. In this example, when the electronic device 100 is submerged underwater, the electronic device 100 can be activate the accelerometer to execute specific functions, such as determine when the electronic device 100 is positioned towards/away from the user. According to some embodiments, the electronic device can associate positioning the electronic device 100 away from the user as zooming-in on a live view image, while positioning the electronic device 100 towards the user can be associated with zooming-out of the live view image. In some cases, the electronic device 100 can utilize the accelerometer in combination with the force input detection component 308 to determine a position of the touch input event.

In some examples, the "Liquid Detection Components" 1560 can include specific settings that optimize detection of the moisture event, which can include examples: (1) "Altitude Pressure Detection," (2) "Electrical Capacitance Detection," (3) Acoustic Detection", (4) "Impedance Detection," and (5) "Light Detection." In one example, when the "Light Detection" setting is executed, the electronic device 100 can increase the sensitivity level of detecting the amount of ambient light while the electronic device 100 is exposed to the moisture event. In particular, because the amount of available natural light is lessened when the electronic device 100 is submerged underwater, the electronic device 100 can boost light sensitivity such as to determine whether the electronic device 100 continues to remain exposed to the moisture event.

In some examples, the "Power Savings Mode" 1570 can include specific settings that are optimal for conserving energy of the electronic device 100 while exposed to the moisture event. In one example, while the electronic device 100 is exposed to the moisture event (e.g., wet mode, submerged underwater mode, etc.), the electronic device 100 can deactivate non-essential components, such as a wireless communications component or a haptic feedback component in order to conserve power. In another example, when the electronic device 100 is exposed to the moisture event, the electronic device can deactivate the intelligent personal assistant and knowledge navigator to conserve power. In another example, subsequent to the electronic device 100 having been exposed to the moisture event, the electronic device 100 can modify its charging behavior. For example, residual moisture may remain within the data-entry port 134. Accordingly, the electronic device 100 can reduce charging capability at the data-entry port 134 to correlate with the removal of the residual moisture.

In some examples, the "Special Modes" 1580 can include (1) a "Rescue Mode," (2) a "Shark Encounter Mode," and (3) "Facial Detection Mode." In one example, when the "Rescue Mode" application is executed by the electronic device 100, it can (a) activate the flash module of the camera unit 190 to emit a repetitive, highly visible strobe pattern, and (b) transmit an emergency call. In another example, execution of the "Shark Encounter Mode" application can cause the electronic device 100 to emit an electromagnetic pulse that when encountered by sharks in proximity to the electronic device 100 can cause the sharks to experience general disorientation and uncontrollable muscle spasms. In one example, the electromagnetic pulse generated by the electronic device 100 can have a low-frequency waveform of about 1-100 nV/cm. In another example, execution of the "Facial Detection Mode" application can cause the electronic device 100 to utilize the camera unit 190 and the environmental sensor 180 to perform facial recognition/detection of persons of persons while the electronic device 100 is submerged underwater. For example, the facial recognition of the user can be utilized to unlock a locked electronic device 100 while exposed to the moisture event.

Figure 16:
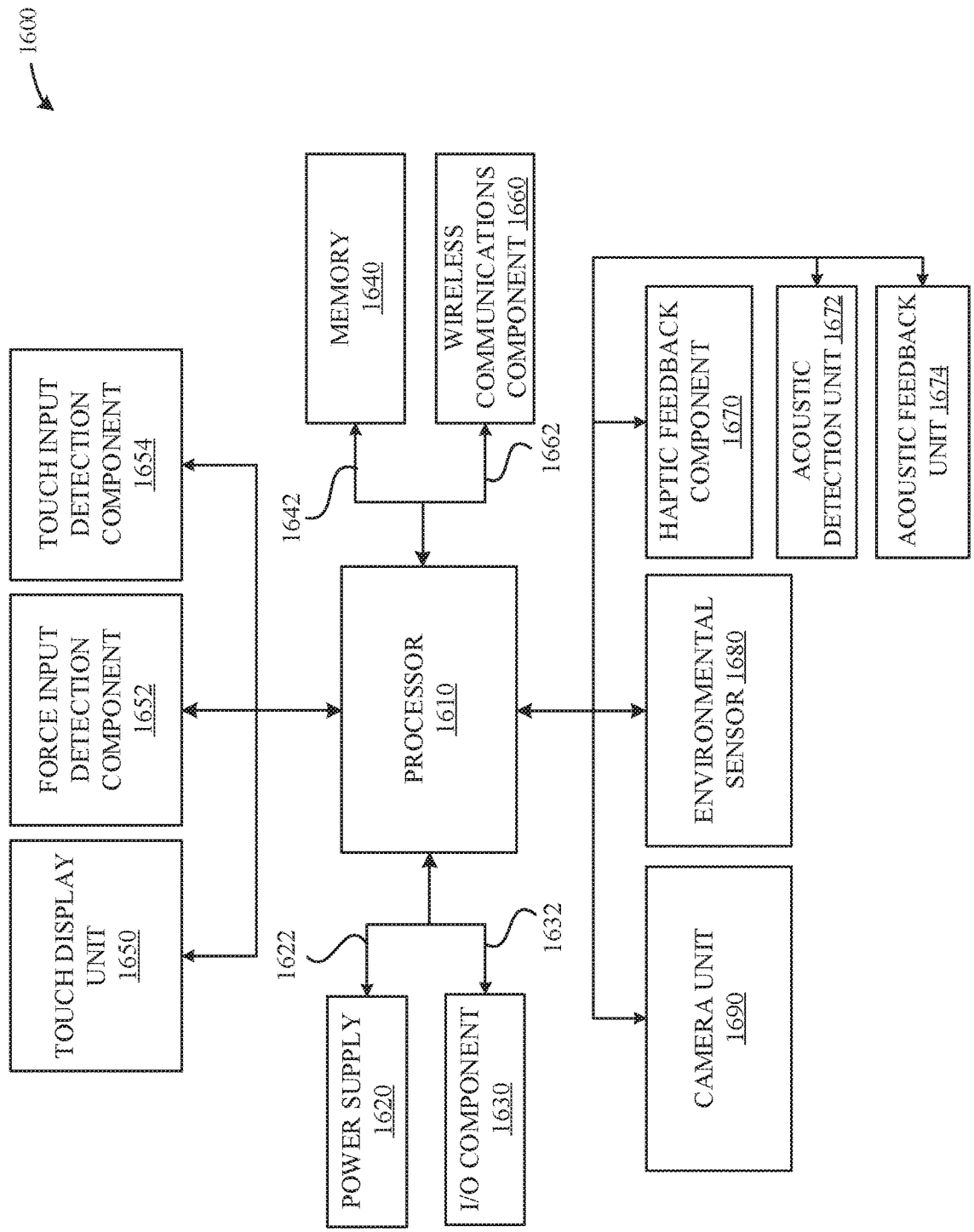
FIG. 16 illustrates a block diagram of an electronic device that is capable of implementing the various techniques described herein, according to some embodiments.

FIG. 16 illustrates a block diagram of an electronic device that is capable of implementing the various techniques described herein, in accordance with some embodiments. As illustrated in FIG. 16, an electronic device 1600—e.g., the electronic device 100—can include one or more processors 1610 for executing functions of the electronic device 1600. The one or more processors 1610 can refer to at least one of a central processing unit (CPU) or microcontrollers for performing dedicated functions.

According to some embodiments, the electronic device 1600 can include a power supply 1620 that can be capable of providing energy to the electronic device 1600. In some examples, the power supply 1620 can refer to a rechargeable battery, where the power supply 1620 is connected to the processor 1610 via one or more connection cables 1622. In some examples, the electronic device 1600 can receive power from another power sources (e.g., another electronic device).

According to some embodiments, the electronic device 1600 can include one or more input/output (I/O) components 1630 that enable communication between a user and the electronic device 1600. In some cases, the I/O component 1630 can refer to button or a switch that is capable of being actuated by the user. In some cases, the I/O component 1630 can refer to a soft key that is flexibly programmable to invoke any number of functions. In some examples, the I/O component 1630 can refer to a switch having a mechanical actuator (e.g., spring-based switch, slide-switch, rocker switch, etc.) or other moving parts that enable the switch to be actuated by the user's appendage. In some examples, the I/O component 1630 can refer to a capacitive switch. In some examples, the I/O component 1630 can refer to a slide-switch that can be actuated between a first position and a second position. When the I/O component 1630 is actuated, the I/O component 1630 can cause an electrical signal to be provided to the processor 1610 via cable 1632.

According to some embodiments, the electronic device 1600 can include at least one memory 1640, which can include a single disk or multiple disks (e.g., hard drives), and includes a storage management module that manages one or more partitions within the memory 1640. In some cases, the memory 1640 can include flash memory, semiconductor (solid state) memory or the like. The electronic device 1600 can also include a Random Access Memory (RAM) and a Read-Only Memory (ROM). The ROM can store programs, utilities or processes to be executed in a non-volatile manner. The RAM can provide volatile data storage, and stores instructions related to the operation of the electronic device 1600. In some embodiments, the memory 1640 refers to a non-transitory computer readable medium, where an operating system (OS) is established at the memory 1640 that can be configured to execute applications or software programs that are stored at the memory 1640. In some embodiments, a data bus 1642 can facilitate data transfer between the memory 1640 and the processor 1610.

In some cases, the applications can be executed in conjunction with a feedback loop mechanism that is established between the processor 1610/memory 1640/touch display unit 1650/force input detection component 1652/touch input detection component 1654/environmental sensor 1680. In some examples, the feedback loop can refer to an open feedback loop or a closed feedback loop.

According to some embodiments, the electronic device 1600 can include a touch display unit 1650, where the touch display unit 1650 can be capable of presenting a user interface that includes at least one icon, as described in greater detail herein. In some examples, each icon can be associated with a respective function that is capable of being executed by the processor 1610. In some cases, the touch display unit 1650 can include a display layer (not illustrated), which can include a liquid-crystal display (LCD), light-emitting diode display (LED), and so forth.

According to some embodiments, the touch display unit 1650 can include a touch input detection component 1654 that can be configured to detect changes in an electrical parameter (e.g., electrical capacitance value) when the user's appendage (acting as a capacitor) comes into proximity/into contact with the touch display unit 1650. In some cases, the touch input detection component 1654 can include a layer of sensing electrodes 318, where each sensing electrode 318 can undergo a change in its respective electrical capacitance value. In some examples, the sensing electrodes 318 are uniformly distributed throughout the touch input detection component 1654. In some examples, the distribution of the sensing electrodes 318 throughout the touch input detection component 1654 can vary according to the desired sensitivity of detecting the touch input.

According to some embodiments, the touch display unit 1650 can include a force input detection component 1652. In some cases, the force input detection component 1652 can be interchangeably referred to as an applied load detector. The force input detection component 1652 can be configured to detect an amount of force/an amount of load that is exerted by the user's appendage against the touch display unit 1650. In some cases, the force input detection component 1652 can include a layer of force sensors 320 that are distributed throughout the force input detection component 1652 that can determine a centroid associated with the amount of force of the touch input at a user interface that is presented at the touch display unit 1650. According to some embodiments, at least one of the touch input detection component 1654 or the force input detection component 1652 can utilize any combination of piezoelectric elements, strain gages, resistance elements, impedance elements, capacitive elements, sensing electrodes, and the like to detect the position of the touch input event.

According to some embodiments, the electronic device 1600 can include a wireless communications component 1660. A network/bus interface 1662 can couple the wireless communications component 1660 to the processor 1610. The wireless communications component 1660 can communicate with other electronic devices via any number of wired or wireless communication protocols, including at least one of a global network (e.g., the Internet), a wide area network, a local area network, a wireless personal area network (WPAN), and the like. In some examples, the wireless communications component 1660 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), and the like.

According to some embodiments, the electronic device 1600 can include at least one haptic feedback component 1670 for generating haptic feedback in conjunction with a presence of one or more events. In some examples, the haptic feedback component 1670 can be configured to generate haptic feedback in response to a user-initiated request. According to some embodiments, the electronic device 1600 can include at least one acoustic detection unit 1672. In some examples, the acoustic detection unit 1672 can refer to a microphone. In particular, the acoustic detection unit 1672 can be capable of receiving a user input (e.g., voice command) in order to execute a user function. According to some embodiments, the electronic device 1600 can include at least one acoustic feedback unit 1674 for generating acoustic feedback in conjunction with an occurrence of at least one event. In some examples, the acoustic feedback unit 1674 is configured to generate acoustic feedback in response to at least one of a user-initiated request or a device-initiated request. In some examples, the acoustic feedback unit 1674 can refer to speakers, voice coils, magnetic resonance tubes or elements, and the like. In some embodiments, the processor 1610 can control the intensity or amount of the acoustic feedback by adjusting an amplitude, frequency, pulse, or polarity of an electrical current that is transmitted from the power supply 1620 to the acoustic feedback unit 1674.

According to some embodiments, the electronic device 1600 can include at least one environmental sensor 1680 that is capable of detecting environmental conditions that are present in the electronic device's surroundings or a general proximity to the electronic device 1600. In some examples, the environmental sensor 1680 can refer to at least one of a light sensor, a proximity sensor, an accelerometer, a humidity sensor, a temperature sensor, a liquid sensor, a pressure sensor, underwater depth sensor, a magnetic field sensor, a strain gage, a capacitive sensor, a force sensor, a gyroscope, a compass, a barometer, an IR light detector, a load cell, thermometer, linear acceleration, fingerprint sensor, and the like. In some embodiments, the environmental sensor 1680 can determine whether the electronic device 1600 is exposed to a specific environmental condition (e.g., a moisture event). In response, the processor 1610 can modify one or more functionalities of the electronic device 1600 according to a specific environmental condition that is detected. According to some embodiments, the environmental sensor 1680 and the processor 1610 can establish a feedback loop for modifying the one or more functionalities according to the specific environmental condition that is detected.

According to some embodiments, the electronic device 1600 can include a camera unit 1690. In some cases, the camera unit 1690 can be capable of taking photographs/ capturing video. Additionally, the camera unit 1690 can include a lighting unit (e.g., a flash module). Aspects of the camera unit 1690 will be described in greater detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device, comprising:
   a housing;
   a processor;
   a display assembly in communication with the processor and overlaid by a protective cover, the display assembly comprising:
      a touch detection system, comprising:
         a capacitance detector to provide a first signal to the processor based at least partially on a change in capacitance associated with a touch event at the protective cover;
         an applied force detector to provide a second signal to the processor based at least partially on an amount and a location of a force applied to the protective cover associated with the touch event;
      a first environmental sensor; and
      a second environmental sensor, wherein the processor, in response to the second environmental sensor detecting an amount of atmospheric pressure present at the housing that is less than or equal to a threshold:
         determines the location of the touch event based at least partially on the first signal and the second signal; and
         adjusts a state of the first environmental sensor.

2. The portable electronic device of claim 1, wherein the second environmental sensor detects an occurrence of a moisture event based at least partially on the amount of atmospheric pressure detected.

3. The portable electronic device of claim 1, wherein the display assembly is capable of presenting a user interface that includes at least a first icon and a second icon that are defined by a first arrangement.

4. The portable electronic device of claim 3, wherein when the amount of atmospheric pressure is greater than the threshold, the processor modifies the user interface such that the first and second icons are defined by a second arrangement.

5. The portable electronic device of claim 1, further comprising a switch, wherein the processor assigns a function to the switch in response to the second environmental sensor detecting the amount of atmospheric pressure present at the housing that is greater than the threshold.

6. The portable electronic device of claim 5, wherein the processor unassigns the function to the switch in response to the amount of atmospheric pressure being less than or equal to the threshold.

7. An electronic device, comprising:
   a housing that defines a cavity;
      a processor disposed in the cavity;
      a touch display unit, comprising:
         a cover layer;
         a force detection component to determine an occurrence of a touch input based on a force applied to the cover layer;
         a capacitance detection component to determine the occurrence of the touch input based on a variance in capacitance at the cover layer;
         a display layer to present a user interface that includes at least a first icon and a second icon defined by a first arrangement, the processor determining whether the first icon or the second icon is selected by the touch input based on a position of the touch input determined by the capacitance detection component; and
      a sensor to provide a signal to the processor based on a threshold being exceeded due to a detected moisture event;
   wherein the processor, in response to the signal:
      determines whether the first icon or the second icon is selected by the touch input based on the position of the touch input determined by the capacitance detection component and the force detection component; and
      adjusts a state of at least one of an acoustic detection unit of the electronic device or an ambient light detector of the electronic device.

8. The electronic device of claim 7, wherein the processor reduces the sensitivity of the acoustic detection unit in response to the signal.

9. The electronic device of claim 7, wherein the sensor detects the moisture event by measuring at least one of an electrical capacitance value at the touch display unit, an amount of light exposure at the electronic device, or an amount of pressure exerted on the electronic device.

10. The electronic device of claim 7, wherein the sensor is capable of determining whether the moisture event corresponds to a wet moisture event or a submerged moisture event.

11. The electronic device of claim 10, further comprising a switch, wherein the processor assigns a specific function to the switch when the sensor determines that the moisture event corresponds to the submerged moisture event.

12. An electronic device comprising:
    a touchscreen unit, comprising;
       a display;
       a cover layer overlying the display;
       a force input detection component to detect an amount of force associated with a touch input on the cover layer;
       a touch input detection component to determine a position of the touch input based on a measured electrical capacitance value;
    an acoustic feedback unit to emit an acoustic sound effect;
    an acoustic detection unit to detect a sound parameter of the emitted acoustic sound effect; and
    a processor to:
       determine an occurrence of a moisture event based at least in part on the detected sound parameter; and
       in response to the occurrence of the moisture event, determine the position of the touch input based on the measured electrical capacitance value and the amount of force detected by the force input detection component.

13. The electronic device of claim 12, further comprising a camera having multiple settings, wherein at least one setting of the multiple settings is altered in response to the detection of the moisture event.

14. The electronic device of claim 13, wherein, when the processor determines the occurrence of the moisture event, the processor responds by forming a modified user interface.

15. The electronic device of claim 14, wherein the user interface includes first and second icons that are defined by a first arrangement, and the first and second icons of the modified user interface are defined by a second arrangement that is different than the first arrangement.

16. The electronic device of claim 15, wherein a distance between the first and second icons of the user interface as defined by the first arrangement is less than a corresponding distance between the first and second icons of the modified user interface as defined by the second arrangement.

17. The electronic device of claim 13, wherein the multiple settings include at least one of a white balance setting, an aperture adjustment setting, a color tone adjustment setting, a microphone sensitivity setting, a flash setting, or an autofocus setting.

* * * * *